United States Patent
Nahum et al.

(10) Patent No.: US 12,548,180 B2
(45) Date of Patent: Feb. 10, 2026

(54) HOLE DIAMETER MEASURING DEVICE

(71) Applicant: Mitutoyo Corporation, Kanagawa-ken (JP)

(72) Inventors: Michael Nahum, Seattle, WA (US); Travis Matthew Eiles, Bothell, WA (US)

(73) Assignee: MITUTOYO CORPORATION, Kanagawa (JP)

( * ) Notice: Subject to any disclaimer, the term of this patent is extended or adjusted under 35 U.S.C. 154(b) by 363 days.

(21) Appl. No.: 18/300,231

(22) Filed: Apr. 13, 2023

(65) Prior Publication Data

US 2024/0346677 A1    Oct. 17, 2024

(51) Int. Cl.
G06T 7/62       (2017.01)
G06T 7/00       (2017.01)
G06T 7/73       (2017.01)

(52) U.S. Cl.
CPC ............... G06T 7/62 (2017.01); G06T 7/001 (2013.01); G06T 7/74 (2017.01); G06T 2207/30136 (2013.01); G06T 2207/30164 (2013.01)

(58) Field of Classification Search
CPC .. G01B 3/18; G06T 7/62; G06T 7/001; G06T 7/74; G06T 2207/30136; G06T 2207/30164
See application file for complete search history.

(56) References Cited

U.S. PATENT DOCUMENTS

| | | | |
|---|---|---|---|
| 4,476,634 A | 10/1984 | Yamamoto et al. | |
| 4,536,963 A | 8/1985 | Yamamoto et al. | |
| 4,550,507 A | 11/1985 | Nishikata | |
| 5,653,037 A * | 8/1997 | Hasegawa | G01K 13/10 33/DIG. 2 |
| 5,871,391 A * | 2/1999 | Pryor | F02F 1/24 356/600 |
| 6,009,189 A * | 12/1999 | Schaack | A61B 5/065 348/42 |

(Continued)

FOREIGN PATENT DOCUMENTS

| | | | |
|---|---|---|---|
| EP | 3008419 B1 * | 3/2018 | ............. G01B 11/12 |
| JP | 2017129531 A | 7/2017 | |

(Continued)

*Primary Examiner* — Chan S Park
*Assistant Examiner* — Chandhana Pedapati
(74) *Attorney, Agent, or Firm* — Seed Intellectual Property Law Group LLP

(57) ABSTRACT

A system for measuring a hole includes a hole measuring device, processor(s) and a memory. The hole measuring device includes an end portion and an imaging portion. The end portion is configured to be inserted in a hole and includes at least first and second outer contact surface portions configured to be biased against the inner surface of the hole such that a contact distance between the first and second outer contact surface portions varies depending on the diameter of the hole. The end portion includes one or more reference surface portions (e.g., which are each configured to move when a corresponding outer contact surface portion moves). The imaging portion acquires an image of the one or more reference surface portions. The acquired image is used to determine relative positions of the one or more reference surface portions, which in turn are used to determine the diameter of the hole.

21 Claims, 15 Drawing Sheets

(56) References Cited

U.S. PATENT DOCUMENTS

| | | | |
|---|---|---|---|
| 6,079,894 A * | 6/2000 | Obitts | A61H 3/02 403/109.2 |
| 6,115,934 A | 9/2000 | Sato et al. | |
| 6,412,187 B1 | 7/2002 | Sasaki et al. | |
| 6,513,257 B2 | 2/2003 | Nejad-Sattari | |
| 7,003,161 B2 | 2/2006 | Tessadro | |
| 7,030,351 B2 | 4/2006 | Wasserman et al. | |
| 7,522,763 B2 | 4/2009 | Tessadro | |
| 7,567,713 B2 | 7/2009 | Ding | |
| 7,627,162 B2 | 12/2009 | Blanford et al. | |
| 8,033,032 B2 | 10/2011 | Fujikawa et al. | |
| 9,297,631 B2 | 3/2016 | Hagino et al. | |
| 9,304,089 B2 | 4/2016 | Gladnick | |
| 9,429,412 B2 | 8/2016 | Nakamura et al. | |
| 9,932,822 B2 | 4/2018 | Watanabe et al. | |
| 10,825,216 B2 | 11/2020 | Abe | |
| 2016/0237808 A1 | 8/2016 | Watanabe et al. | |
| 2021/0007590 A1 | 1/2021 | Ramesh et al. | |

FOREIGN PATENT DOCUMENTS

| | | | |
|---|---|---|---|
| JP | 6622475 B2 | 12/2019 | |
| JP | 6804624 B2 | 12/2020 | |

\* cited by examiner

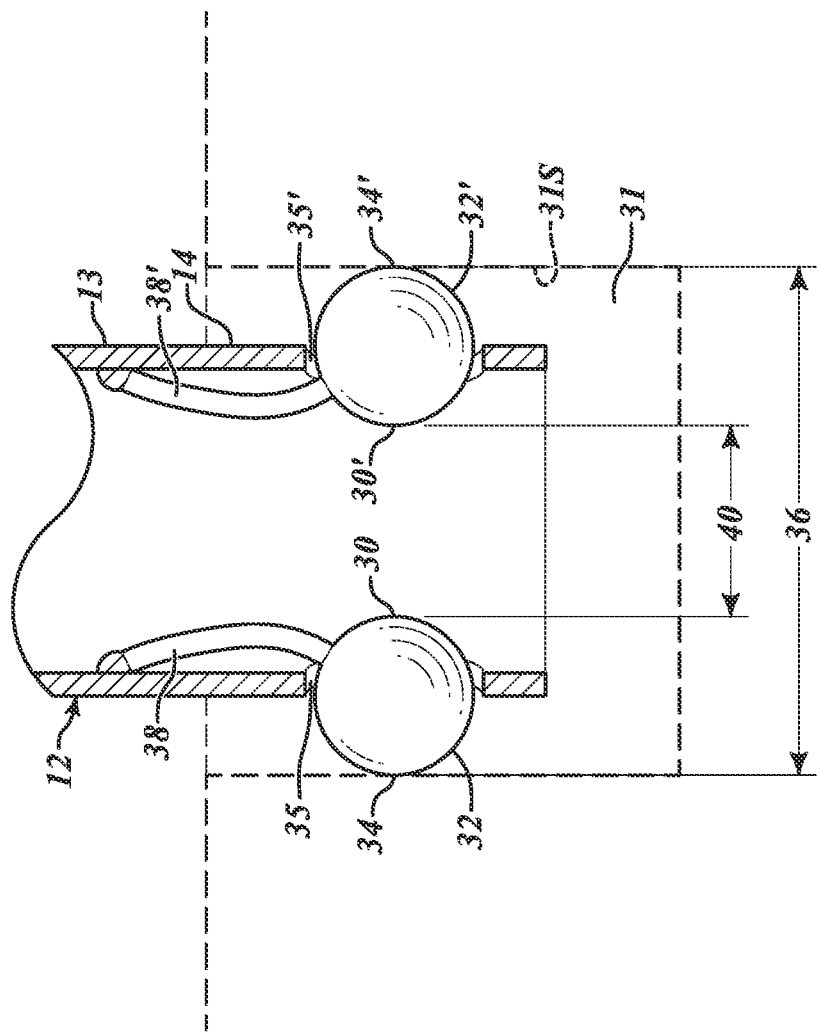

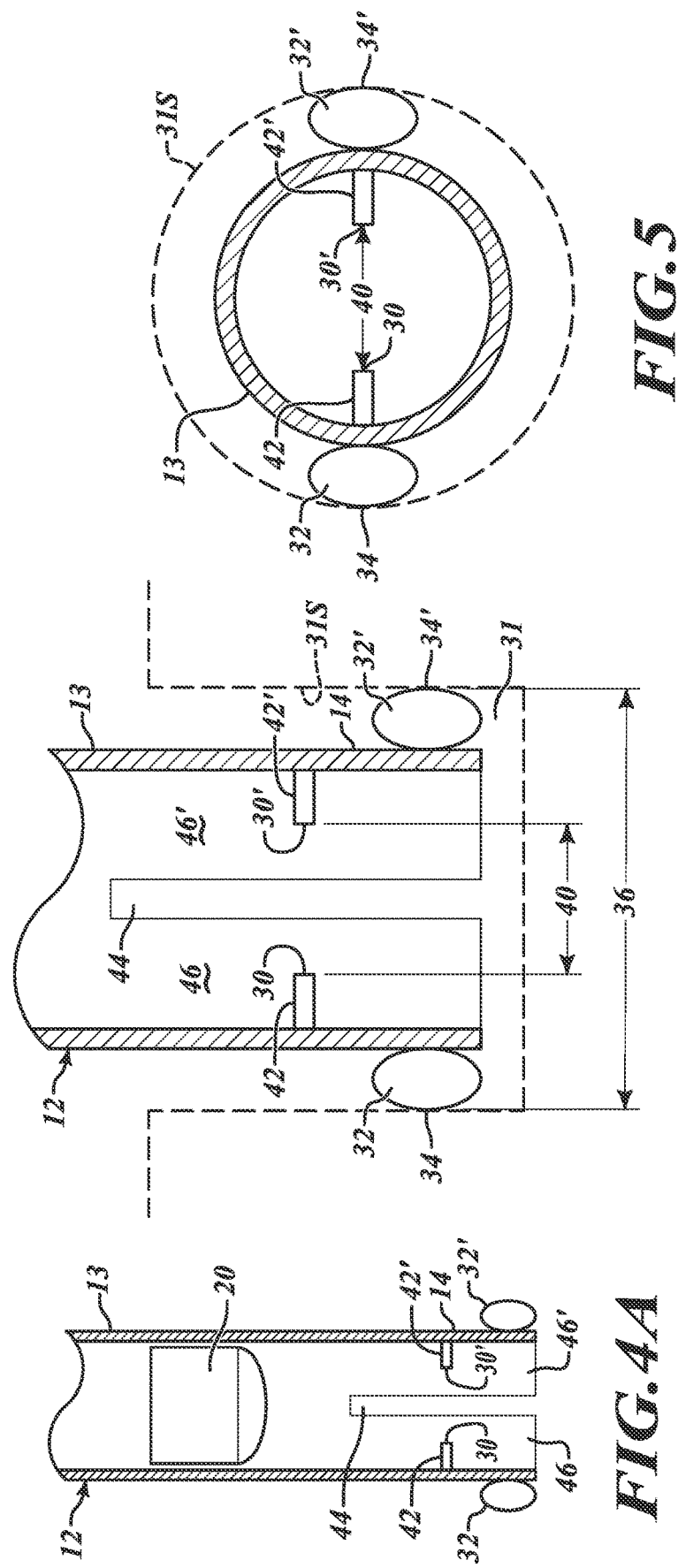

1600

1610 — Utilize an imaging portion to acquire an image of one or more reference surface portions when an end portion of a hole measuring device is inserted in a hole which is to be measured (e.g., wherein the end portion comprises: a plurality of outer contact surface portions which are configured to contact the inner surface of the hole when the end portion is inserted in the hole, the plurality of outer contact surface portions comprising at least first and second outer contact surface portions which are configured to be biased against the inner surface of the hole when the end portion is inserted in the hole and for which a contact distance between the first and second outer contact surface portions varies depending on the diameter of the hole; and one or more reference surface portions, wherein the one or more reference surface portions comprise at least a first reference surface portion which is configured to move when the first outer contact surface portion moves and for which a relative position of the first reference surface portion varies depending on the diameter of the hole)

1620 — Utilize the image to determine a relative position of at least the first reference surface portion 1630 — Determine a dimension which at least one of indicates or is equal to the diameter of the hole based at least in part on the relative position of the first reference surface portion (e.g., wherein the determining of the dimension is based at least in part on determining a reference distance between the first reference surface portion and a second reference surface portion, for which the reference distance correspondingly indicates a relative position of the first reference surface portion)

*FIG.16*

HOLE DIAMETER MEASURING DEVICE

BACKGROUND

Technical Field

This disclosure relates to precision metrology and, more particularly, to a device for measuring a diameter of a hole.

Description of the Related Art

A bore gauge is known which measures an inner diameter of a hole. A bore gauge, which measures a displacement of a gauge head by converting the displacement into a displacement of a rod in a direction perpendicular to the gauge head, is described in U.S. Pat. No. 9,932,822 ("the '822 patent"), which is hereby incorporated herein by reference in its entirety. As described in the '822 patent, a head part of a bore gauge may include a head main body part, a lower rod, a gauge head, an anvil, and a guide member. U.S. Pat. No. 8,033,032, which is hereby incorporated herein by reference in its entirety, describes an inside diameter measuring tool which includes: a body; an axially moving spindle having a screw to be screwed to the body; a plurality of contact pieces provided on the body, wherein the contact pieces advance and retract in a direction substantially orthogonal to the axial direction of the spindle; and a conical member interposed between the contact pieces and the spindle, wherein the conical member moves the contact pieces in the direction substantially orthogonal to the axial direction of the spindle in accordance with the axial movement of the spindle.

Certain configurations of such devices have limitations, such as difficulty with being manufactured in small enough dimensions to be suitable for fitting into and accurately measuring certain very small holes. In addition, the mechanisms which convert radial displacement into a perpendicular displacement for the measurements may experience wear or other degradation over time which may correspondingly affect the operation and accuracy of the device. A device with characteristics which provide improvements with respect to such aspects would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a system for measuring a hole is provided. The system includes a hole measuring device, which comprises an end portion and an imaging portion. The end portion is configured to be inserted in a hole which is to be measured, and comprises a plurality of outer contact surface portions which are configured to contact the inner surface of the hole when the end portion is inserted in the hole. The plurality of outer contact surface portions comprise at least first and second outer contact surface portions which are configured to be biased against the inner surface of the hole when the end portion is inserted in the hole, such that a contact distance between the first and second outer contact surface portions varies depending on the diameter of the hole. The end portion further comprises one or more reference surface portions. The one or more reference surface portions comprise at least a first reference surface portion which is configured to move when the first outer contact surface portion moves, such that a relative position of the first reference surface portion varies depending on the diameter of the hole. The imaging portion of the hole measuring device is configured to acquire images of the one or more reference surface portions.

The system also includes one or more processors, and a memory coupled to the one or more processors and storing program instructions that when executed by the one or more processors cause the one or more processors to at least:
utilize the imaging portion to acquire an image of the one or more reference surface portions when the end portion is inserted in the hole which is to be measured;
utilize the image to determine a relative position of at least the first reference surface portion; and
determine a dimension which at least one of indicates or is equal to the diameter of the hole based at least in part on the relative position of the first reference surface portion.

According to another aspect, a method for utilizing the hole measuring device is provided. The method comprises:
utilizing the imaging portion to acquire an image of the one or more reference surface portions when the end portion is inserted in the hole which is to be measured;
utilizing the image to determine a relative position of at least the first reference surface portion; and
determining a dimension which at least one of indicates or is equal to the diameter of the hole based at least in part on the relative position of the first reference surface portion.

According to yet another aspect, the hole measuring device is provided, which includes the end portion and the imaging portion. The imaging portion is configured to acquire images of the one or more reference surface portions. Specifically, the imaging portion is configured to be utilized to acquire an image of the one or more reference surface portions when the end portion is inserted in the hole which is to be measured. The acquired image is configured to be utilized to determine a relative position of at least the first reference surface portion. A dimension which at least one of indicates or is equal to the diameter of the hole is determined based at least in part on the relative position of the first reference surface portion.

BRIEF DESCRIPTION OF THE DRAWINGS

FIGS. 2A and 2B are diagrams illustrating an implementation of a hole measuring device with first and second reference surface portions on first and second movable elements;

FIGS. 4A and 4B are diagrams illustrating an implementation of a hole measuring device with first and second reference surface portions on first and second reference elements;

FIG. 5 is diagram illustrating a cross-sectional top view of the hole measuring device of FIGS. 4A and 4B;

FIG. 16 is a flow diagram illustrating one embodiment of a general routine for utilizing a hole measuring device as disclosed herein.

DETAILED DESCRIPTION

Figure 1:
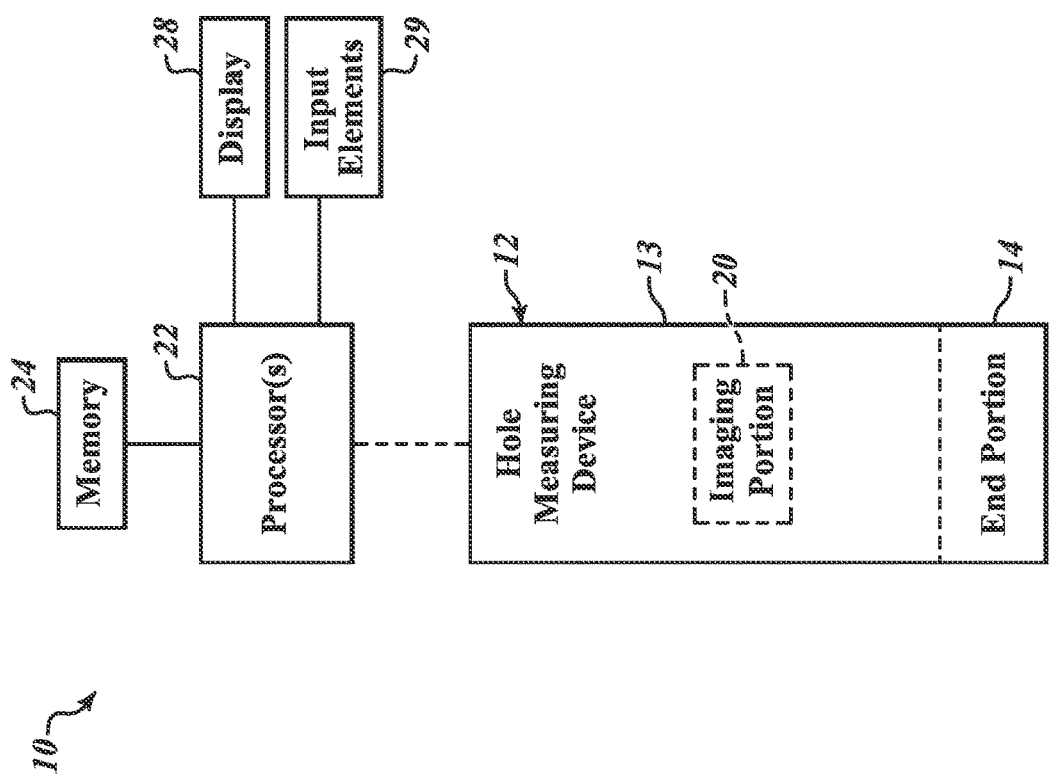
FIG. 1 is a diagram showing a system including a hole measuring device for measuring a diameter of a hole.

FIG. 1 illustrates an overall configuration of a system 10 for measuring a hole. The system 10 includes a hole measuring device 12, one or more processor(s) 22, and a memory 24 coupled to the one or more processors 22 and storing program instructions. In various implementations, the hole measuring device 12 includes an end portion 14, which is configured to be inserted in a hole to be measured, and an imaging portion 20. The program instructions, when executed by the one or more processors 22, cause the one or more processors 22 to perform defined operations based on images (e.g., as obtained by the imaging portion 20, as will be more fully described below).

The imaging portion 20 comprises any suitable imaging element such as an imaging sensor or camera (e.g., a very small sensor or camera such as a type utilized in endoscope or other miniaturized applications, etc.). The imaging portion 20 is configured to acquire images of the end portion 14 or, more specifically, of reference surface portions in the end portion 14 (e.g., so that a diameter of a hole in which the end portion 14 is inserted may be determined, as will be described in more detail below).

The one or more processors 22 receive image signals from the imaging portion 20 and process the image signals to determine a diameter of a hole in which the end portion 14 is inserted. It will be appreciated that the one or more processors 22 may comprise any combination of signal processing and physical circuitry. The one or more processors 22 may be coupled to a display 28 and input element(s) 29 such as a touch screen, a key board, etc. In some embodiments, the one or more processors 22, display 28, and/or input elements 29 may be embodied in a portable computer device such as a personal computer, a tablet device, a smartphone, etc. In some embodiments, the one or more processors 22, display 28, and/or input elements 29 may be embodied in a measuring machine (e.g., a coordinate measuring machine, for which the hole measuring device 12 may function as a type of probe, etc.). In other embodiments, the one or more processors 22, display 28, and/or input elements 29 may be integrally formed with the hole measuring device 12 (e.g., as part of an integrated measuring device).

Those skilled in the art will appreciate that the one or more processors 22 may generally be embodied as a signal processing electronic circuit in integrated circuit (IC) chip(s) and/or included in any suitable computing system or device, including distributed or networked computing environments, and the like. Such computing systems or devices may include the one or more processors 22 as one or more general-purpose or special-purpose processors (e.g., non-custom or custom devices) that execute software to perform the functions described herein. Software may be stored in the memory 24, such as random-access memory (RAM), read-only memory (ROM), flash memory, or the like, or a combination of such components. Software may also be stored in the memory 24 in the form of one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

FIGS. 2A and 2B are diagrams illustrating an implementation of a hole measuring device 12 with first and second reference surface portions 30 and 30' on first and second movable elements 32 and 32'. FIG. 2B is an enlarged view of a lower part of the end portion 14 inserted in the hole 31 as shown in FIG. 2A.

The hole measuring device 12 in the illustrated implementation includes the end portion 14 configured to be inserted in a hole 31 and the imaging portion 20. The end portion 14 includes a plurality of outer contact surface portions 34, 34' which are configured to contact the inner surface 31S of the hole 31 when the end portion 14 is inserted in the hole 31. The plurality of outer contact surface portions comprise at least first and second outer contact surface portions 34 and 34' which are configured to be biased against the inner surface 31S of the hole 31 when the end portion 14 is inserted in the hole 31, such that a contact distance 36 between the first and second outer contact surface portions 34 and 34' varies depending on the diameter of the hole 31. In various exemplary implementations, the contact distance 36 corresponds to or indicates the diameter of the hole 31.

The end portion 14 further includes one or more reference surface portions 30, 30', wherein the one or more reference surface portions include at least a first reference surface portion 30 which is configured to move when the first outer contact surface portion 34 moves, such that a relative position of the first reference surface portion 30 varies depending on the diameter of the hole 31. Determination of the relative position of the first reference surface portion 30 will be more fully described below.

In the illustrated implementation, the end portion 14 includes one or more movable elements 32, 32' which may be in the form of spheres for example, and one or more flexible portions 38, 38' to which the one or more movable elements 32, 32' are respectively coupled. In various implementations, the one or more movable elements 32, 32' are formed of hard material (e.g., steel, etc.) and allowed to have little or no compliance. The one or more flexible portions 38, 38' enable the one or more movable elements 32, 32' to be pushed inward (e.g., toward an axis of the hole 31) when the end portion 14 is inserted in the hole 31. Each of the flexible portions 38, 38' has a spring force which biases the respective movable elements 32, 32' (e.g., and correspondingly the first and second outer contact surface portions 34, 34') outward toward the inner surface 31S of the hole 31 when the end portion 14 is inserted in the hole 31. The first and second outer contact surface portions 34 and 34' may be located on the one or more movable elements 32, 32' (e.g., on the outside surfaces thereof), and the first and second reference surface portions 30, 30' may also be located on the one or more movable elements 32, 32' (e.g., on the inside surfaces thereof).

In the illustrated implementation, the hole measuring device 12 includes a support element 13, such as a metal tube, which contains an image sensor (e.g., a camera) of the imaging portion 20. The plurality of outer contact surface portions 34, 34' and the one or more reference surface portions 30, 30' may be coupled to the support element 13. For example, when the plurality of outer contact surface portions 34, 34' are located on the outer surfaces of the movable elements 32, 32' and the one or more reference surface portions 30, 30' are located on the inner surfaces of the movable elements 32, 32', the movable elements 32, 32' may be attached to the support element 13 via the flexible portions 38, 38' while being able to radially move through openings 35, 35' provided in the sides of the support element 13. The openings 35, 35' may be configured in various shapes (e.g., round holes, slits, etc.) as long as they are large enough to accommodate radial movement of the movable elements 32, 32' therethrough.

In various implementations, the hole measuring device 12 may be particularly suited for measuring relatively small holes. As some examples, for all of the implementations as described herein, the support element (e.g., metal tube) 13 may have a relatively small diameter, such as 5 mm, 3 mm, 0.5 mm or smaller, etc., such as may enable measurements of the diameters of relatively small holes 31 (e.g., holes 31 with diameters of 10 mm or less, or 5 mm or less, or as small as 0.5 mm, etc.).

As illustrated in FIGS. 2A and 2B, when the first and second reference surface portions 30 and 30' are inner surfaces on the insides of the movable elements 32 an 32' (e.g., generally opposite to the outer contact surface portions 34, 34' thereon), a reference distance 40 between the first and second reference surface portions 30 and 30' may be determined/measured when the end portion 14 is inserted in the hole 31. The reference distance 40 may be used to determine and/or otherwise indicate or correspond to the relative position of the first reference surface portion 30 according to some implementations.

Specifically, as shown in FIG. 2A, the imaging portion 20 (e.g., an endoscope-type camera) is configured and used to acquire images of the one or more reference surface portions 30, 30' in the end portion 14 of the hole measuring device 12. In various implementations, the imaging portion 20 may include an illumination portion (e.g., including a light source) that is utilized for providing illumination within the end portion 14 when images are acquired by the imaging portion 20.

The program instructions stored in the memory 24, when executed by the one or more processors 22, cause the one or more processors 22 to perform the following to determine a dimension (e.g., a diameter) of a hole 31. First, the one or more processors 22 utilize or control the imaging portion 20 to acquire an image of the one or more reference surface portions 30, 30' when the end portion 14 is inserted in the hole 31 to be measured. The one more processors 22 then utilize the acquired image to determine the relative position of at least the first reference surface portion 30, and determine a dimension which at least one of indicates or is equal to the diameter of the hole 31 based at least in part on the relative position of the first reference surface portion 30.

The relative position of the first reference surface portion 30 may be determined in various ways relative to different reference points in the end portion 14. In exemplary implementations, the determination of the relative position of the first reference surface portion 30 includes determining the reference distance 40 between the first and second reference surface portions 30, 30', wherein the reference distance 40 indicates the relative position of the first reference surface portion 30 in relation to the second reference surface portion 30', for example. In the illustrated implementation, the second reference surface portion 30' is configured to move when the second outer contact surface portion 34' moves (e.g., in a radial direction), similarly to how the first reference surface portion 30 is configured to move when the first outer contact surface portion 34 moves (e.g., in a radial direction). Once the reference distance 40 is determined, the dimension which at least one of indicates or is equal to the diameter of the hole 31 may be determined based at least in part on the reference distance 40 (e.g., by adding the diameters of the spherical movable elements 32, 32' to the reference distance 40 between the first and second reference surface portions 30, 30').

In various implementations, the contact distance 36 between the first and second outer contact surface portions 34, 34' is at least one of indicative of or is equal to the diameter of the hole 31. The reference distance 40 between the first and second reference surface portions 30, 30' is related to the contact distance 36 between the first and second outer contact surface portions 34, 34', such that a change in the contact distance 36 results in a change in the reference distance 40.

In some implementations the imaging portion 20 may or may not be included inside the support element 13 (e.g., may be located above to take images through the support element 13, such as coupled to/attached to a top part of the support element 13), or may be included in a part of the support element 13 with a larger diameter than the end portion 14. That is, unlike the end portion 14 which may be configured to have a relatively small diameter, such as 5 mm, or 0.5 mm, etc., in order to fit into and measure very small holes 31, the imaging portion 20 may not have strict dimensional constraints in some applications. As such, the imaging portion 20 may also be relatively small, or may be somewhat larger than the hole diameter to be measured in some applications.

Figure 3A:
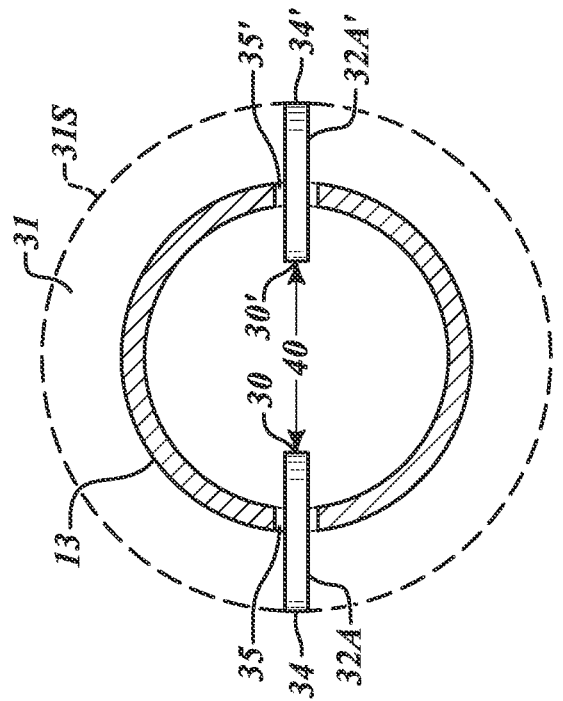
FIGS. 3A and 3B are diagrams of cross-sectional top views of the hole measuring device of FIGS. 2A and 2B with different implementations of the movable elements.
Figure 3B:
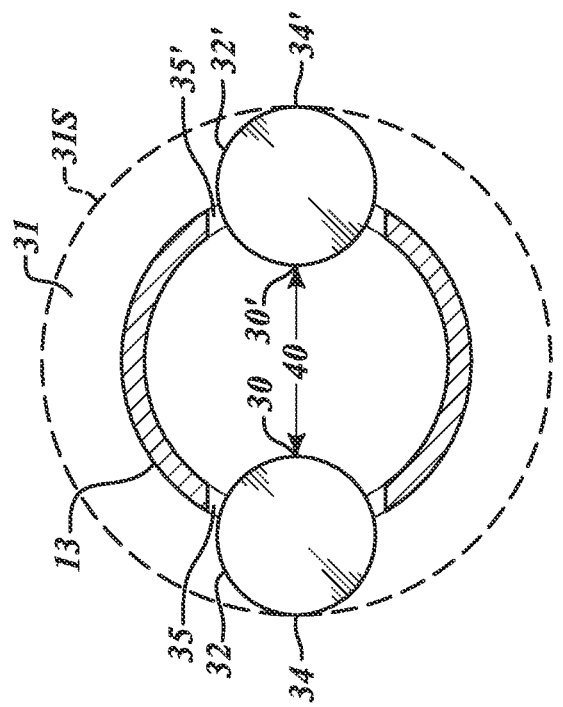

FIGS. 3A and 3B are diagrams of cross-sectional top views of the hole measuring device 12 of FIGS. 2A and 2B with different implementations of the movable elements 32, 32A. FIG. 3A is a cross-sectional top view of the hole measuring device 12 including the movable elements 32, 32' which are spheres. FIG. 3B is a cross-sectional top view of the hole measuring device 12 including the movable elements 32A, 32A' which are circular/round disks. As with the spherical movable elements 32, 32' in FIGS. 2A-3A, in various implementations the disk-shaped movable elements 32A, 32A' are formed of hard material (e.g., such as steel, etc.) and are allowed to have little or no compliance.

FIGS. 3A and 3B are top views and, thus, an image acquired by the imaging portion 20 (e.g., a camera image) may correspond to an area within the support element 13 (e.g., within the metal tube), for which the downward view from the imaging portion 20 captures at least part of what can be seen inside the support element 13.

FIG. 3A shows the movable elements 32, 32' which are spheres and corresponds to the hole measuring device 12 of FIGS. 2A and 2B which also includes the spherical movable elements 32, 32'.

FIG. 3B shows an example of the hole measuring device 12 including the movable elements 32A, 32A' which are circular disks rather than spheres, such that in the top view each of the movable elements 32A, 32A' appears rectangular. In one specific example implementation, the support element 13 (e.g., metal tube) may have a specified diameter, and the imaging portion 20 may be configured to capture an image including the entire area within the support element 13, or only a portion of the area within the support element 13. In various exemplary implementations, the image must generally be large enough to capture at least the first and second reference surface portions 30, 30' so that the reference distance 40 can be determined. For example, in one specific implementation, the support element 13 may have a diameter of 3 mm, while an image of the imaging portion 20 may be at least 2 mm×2 mm (e.g., such as illustrated in the example dimensions of images shown in FIGS. 9 and 10 to be described later).

FIGS. 4A and 4B are diagrams illustrating an implementation of a hole measuring device 12 with first and second reference surface portions 30, 30' provided on first and second reference elements 42, 42', unlike on the first and second movable elements 32, 32' in the implementations illustrated in FIGS. 2A-3B above.

In the present implementation, rather than having the outer contact surface portions 34, 34' and the reference surface portions 30, 30' on the same movable elements 32, 32', the movable elements 32, 32' in this implementation only include the outer contact surface portions 34, 34'. As with the movable elements 32, 32' or 32A, 32A' in FIGS. 2A-3B, the one or more movable elements 32, 32' provided radially outside the support element 13 are also formed of hard material (e.g., such as steel, etc.) and are allowed to have little or no compliance. The reference surface portions 30, 30' are alternatively included on separate reference elements 42, 42' that are attached inside the support element 13 (e.g., as attached to the inside surface wall of the support element 13). In the illustrated implementation, the support element 13 forming the end portion 14 includes one or more slits 44 extending along an axis of the support element 13 to facilitate radially-inward flexing of the sides of the support element 13 when the end portion 14 is inserted in a hole. Specifically, as the end portion 14 of the hole measuring device 12 is inserted into a hole 31, and the first and second movable elements 32, 32' contact the top edges of the hole 31, two sides 46, 46' of the support element 13 (e.g., the metal tube) separated by the slits 44 at the bottom are squeezed inward (e.g., as enabled by the slits 44 in the tube which provide flexibility and spacing for the sides 46, 46' to be squeezed inward). As the sides 46, 46' of the tube 13 (e.g., which may be referenced as flexible portions functionally equivalent to the flexible portions 38, 38' of FIGS. 2A and 2B) are squeezed inward, the reference elements 42, 42' which are attached to the inner sides of the support element 13 are correspondingly also pushed inward, thus changing the reference distance 40.

FIG. 5 is diagram illustrating a cross-sectional top view of the hole measuring device 12 of FIGS. 4A and 4B. Similar to FIGS. 3A and 3B, an image acquired by the imaging portion 20 includes at least part of the view within the support element 13 including at least the first and second reference surface portions 30, 30' so that the reference distance 40 can be determined.

As before, the reference distance 40 can be used to determine an indication of the diameter of the hole 31, in accordance with an equation and/or known calibration amounts.

For example, in one implementation, calibration may be performed using a series of holes 31 of known diameters, for which different reference distances 40 may be correlated to the known diameters and stored as calibration data (e.g., in a look-up table or formulaic representation, etc.). Interpolation may also be utilized for diameters between those of the holes 31 used for the calibration. At a later time when a measurement is performed and a reference distance 40 is determined, the calibration data may be utilized to determine a hole diameter that corresponds to the measured/determined reference distance 40.

FIGS. 6-12 below will be described in terms of example operations of edge tools (e.g., point and box edge tools), which in certain embodiments may be analogous to "video tools" which may utilize scan lines to determine edge locations (e.g., as corresponding to locations of reference surface portions 30, 30' in the examples herein). It will be appreciated that in various implementations, similar operations (e.g., including utilization of scan lines or similar techniques) may be performed to determine edge locations, which may be performed automatically, in some cases without otherwise displaying and/or utilizing other features of the "video tool" or other tool type features illustrated and described below with respect to the simplified examples of FIGS. 6-12. Various analogous video tools are described in U.S. Pat. Nos. 7,003,161; 7,030,351; 7,522,763; and 7,567,713; and 7,627,162, each of which is hereby incorporated herein by reference in its entirety.

Figure 6:
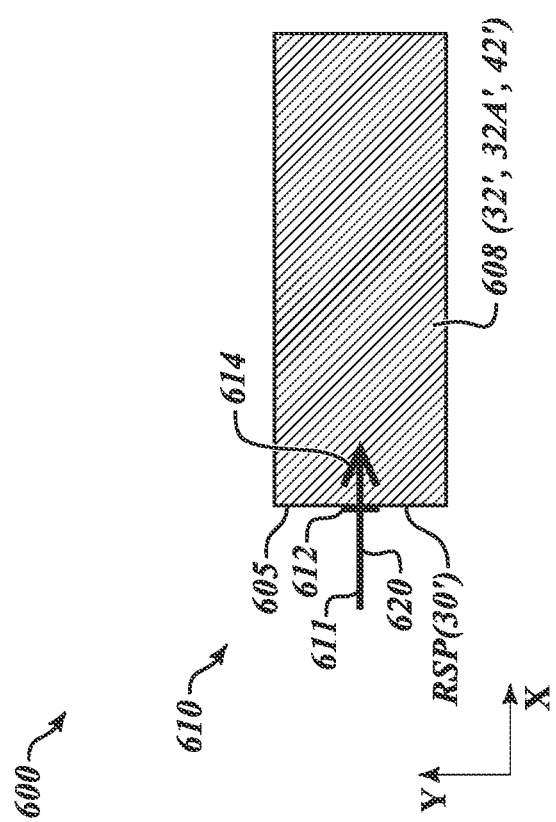
FIG. 6 is a diagram of an exemplary point tool overlaying a reference surface portion (e.g., as corresponding to an edge) in an image.

FIG. 6 is a diagram of an exemplary point tool 610 overlaying an edge 605 corresponding to a reference surface portion (RSP) (e.g., the reference surface portion 30' of the second movable element 32', 32A' in FIGS. 3A and 3B or of the second reference element 42' in FIG. 5) at the boundary of a darker or shaded area 608 in an image 600 such as acquired by the imaging portion 20 of FIG. 1, 2A or 4A. In FIG. 6, as well as in further figures described below, shaded areas such as the shaded area 608 are shown for purposes of illustration, to indicate pixels with relatively higher "gray values" in an image which are assumed in these examples to correspond to the areas of the movable elements 32 or reference elements 42, on the edges thereof the reference surface portions RSP (30') are located. In various implementations, higher gray values may correspond to relatively lower intensity pixels, or relatively higher intensity pixels, depending on the configuration.

As will be described in more detail below, the point tool 610 may be configured for determining the location of an edge point on an edge in the image 600, and similar operations may underlie the operation of another type of tool (e.g. a box-type edge tool) that locates multiple edge points on an edge, as will be described in more detail below in reference to FIG. 7. In certain implementations, the point tool 610 may include a body 611, an edge selector 612, and a polarity indicator arrowhead 614. The arrowhead 614 may generally point from light-to-dark, or dark-to-light, across an edge 605 to enhance edge-finding reliability in certain situations, as explained in the incorporated references. In the illustration of FIG. 6, the body 611 obscures a nominal scan line 620 defined by, and nominally coinciding with, the body 611. Scan lines (620 and 720) will also be illustrated and described in more detail below with reference to FIG. 7. In various implementations, certain of the operations described below (e.g., utilizing the scan lines 620, 720 for determining an edge location) may be performed automatically by the system 10 as part of a process for measuring a hole 31 without displaying the corresponding video tool features on an image or on a display.

In operation, the system 10 may be configured to automatically select and utilize a point tool and/or corresponding operations (e.g., utilizing scan line(s) 620) or a user may select the point tool 610 or corresponding operations. The system 10 or user may identify an edge feature to be detected (i.e., the reference surface portion RSP (30')) by placing the body 611 over the edge feature and placing the edge selector 612 as close as possible to the edge 605, at a desired location along the edge 605. The point tool body 611 may be oriented to define and indicate a desired scan line orientation across the edge 605 (e.g., which for simplicity in the illustrated example is parallel to the x-axis of the illustrated x-y coordinate system but may alternatively be at an angle relative to the x and y axes within the x-y coordinate system in certain implementations). In FIG. 6, and other figures herein, image pixels are arranged in rows along the x-coordinate direction and columns along the y-coordinate direction. The arrow 614 points along a reference direction or polarity to be associated with the edge detection. In operation, once the point tool 610 is configured (and/or once corresponding operations are automatically determined and/or performed), the instructions of an underlying edge point locating routine may be executed to perform operations that analyze intensity profile data points (e.g., pixel intensity data) associated with a scan line 620 that nominally coincides with the body 611 of the point tool 610, and perform various operations to detect the location of the edge 605 corresponding to the reference surface portion RSP (30'). As will be described in more detail below with respect to FIG. 8, in various exemplary embodiments, the edge point locating routine of the point tool 610 may determine an edge location (an RSP location) based on the magnitude of the gradient along an intensity profile associated with the scan line.

Figure 7:
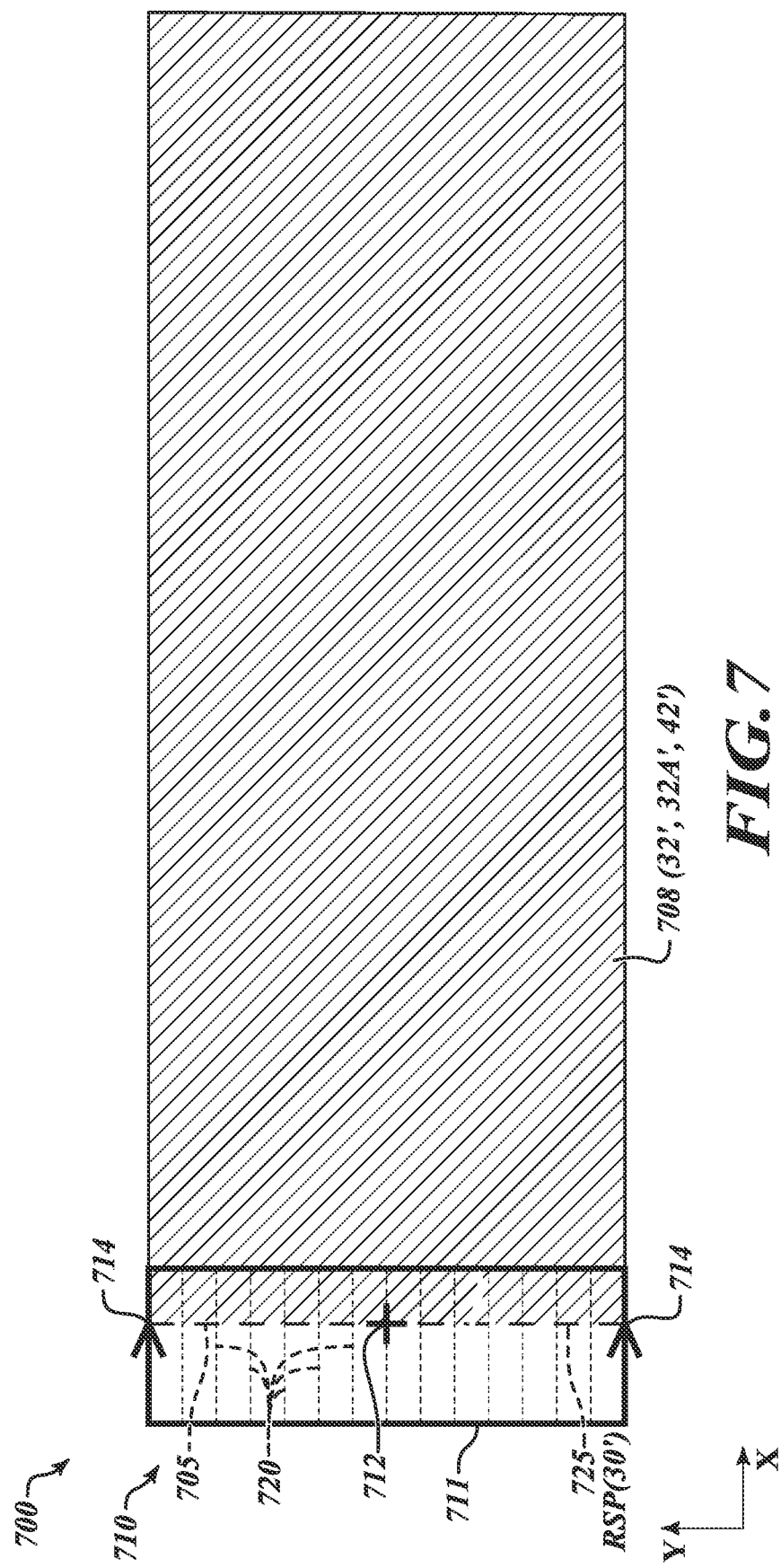
FIG. 7 is a diagram of an exemplary box tool overlaying a reference surface portion (e.g., as corresponding to an edge) in an image.

FIG. 7 is a diagram of an exemplary box tool 710 overlaying an edge 705 corresponding to a reference surface portion (RSP) (e.g., the reference surface portion 30' of the second movable element 32', 32A' in FIGS. 3A and 3B or of the second reference element 42' in FIG. 5) at the boundary of a shaded area 708 in an image 700 such as acquired by an imaging portion 20 of FIG. 1, 2A or 4A. In the illustrated implementations, the shaded area 708 corresponds to the areas of the movable elements 32', 32A' or the reference element 42', on the edges thereof the reference surface portions RSP (30') are provided. In various implementations, the box tool 710 may include a region of interest (ROI) indicator 711, polarity indicator arrows 714 along the sides, and an edge selector 712 that is positioned on the desired edge to be detected. Within the box tool 710, nominal scan lines 720 may be indicated, which the box tool 710 generates and uses for determining edge points. Along each of the nominal scan lines 720, the box tool 710 operates to determine an edge point of the underlying feature, as previously described for the scan line 620 of the point tool 610 of FIG. 6. As shown in FIG. 7, and as will be described in more detail below, a line 725 may be fit to the set of determined edge points, to determine the location and orientation of the edge 705, which corresponds to the reference surface portion RSP (30').

In operation, the box tool 710 is selected and/or otherwise configured to identify an edge feature to be detected (i.e., the reference surface portion RSP (30')). The ROI indicator 711 may be positioned, sized and rotated (e.g., automatically or by an operator), such that the ROI includes the portion of the edge feature to be detected, and the edge selector 712 may be positioned to more precisely identify the edge 705 to be detected at a desired location along the edge 705. The ROI indicator 711 may be oriented to define and indicate a desired scan line orientation across the edge 705. More generally, the orientation of the overall ROI indicator 711, the portions of the ROI indictor 711 that include the arrows 714, or the orientations of the nominal scan lines 720 and/or corresponding operations may each be used to define and/or indicate the scan line orientation. The arrows 714 define the polarity to be associated with the edge detection. Once the box tool 710 is configured, the instructions of an underlying edge point locating routine may be executed to perform operations that analyze intensity profile data to detect edge points along each of the scan lines 720 and fit a line 725 to the detected edge points, as described in greater detail below.

To summarize, in general, edge points may be determined by various tools and/or corresponding operations, which in various implementations may fit geometric forms to the edge points in order to determine locations of corresponding underlying image features (e.g., as part of a process for determining the precise locations of reference surface portions RSP, 30, 30', etc.). In one conventional method of operating a tool, depending on the type of tool (e.g. point tool and box tool), one or more nominal scan lines 620, 720 are defined or generated (e.g., within a ROI or otherwise, such as according to defined tool parameters). For each nominal scan line 620, 720, a set of intensity profile data point locations are determined that approximate the nominal scan line 620, 720. Intensity values associated with the data point locations are determined, to define the intensity profile associated with the nominal scan line 620, 720. Then, in one embodiment, an edge detection algorithm analyzes gradients along the intensity profile to find the location along the intensity profile that corresponds to the maximum gradient magnitude, as described in more detail below with reference to FIG. 8. The maximum gradient location along the intensity profile is used to determine the edge point location in the image 600, 700 that is associated with the nominal scan line.

Figure 8:
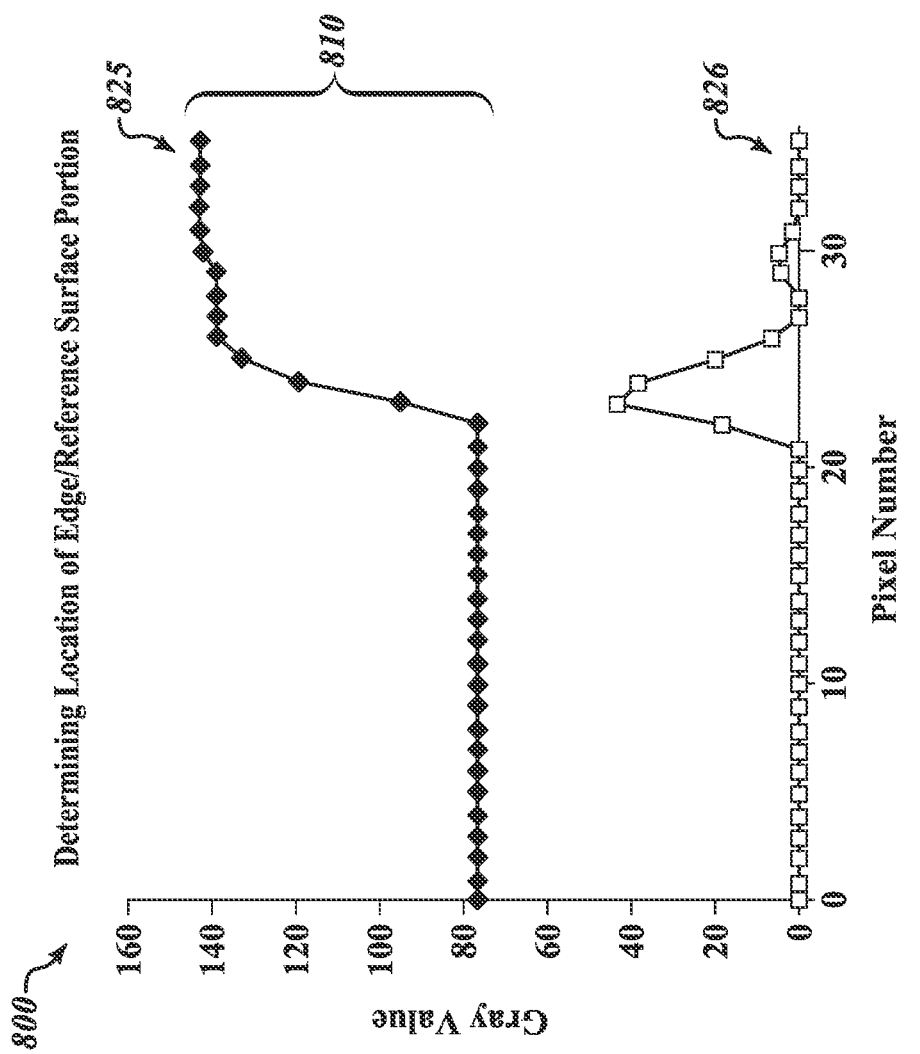
FIG. 8 is a diagram illustrating one exemplary method of determining a location of a reference surface portion (e.g., as corresponding to an edge location) based on a set of pixel gray values.

FIG. 8 is a diagram of a graph 800 illustrating one exemplary method of determining an edge location (e.g., corresponding to a location of a reference surface portion RSP (30, 30')) based on an intensity profile 810. The intensity profile 810 comprises a set of image pixel intensity (gray) values 825 corresponding to positions of a scan line (e.g. such as one of the scan lines 620 or 720 shown in FIG. 6 or 7, respectively). The data points or positions representing the scan line are labeled as "Pixel Numbers" from 0-35 along the horizontal axis. Beginning from data point 0, the pixel intensity values 825 initially indicate a relatively lighter region up to approximately data point 23, which is then followed by a relatively darker region up to data point 35.

It will be appreciated that the values and illustrations in FIGS. 6, 7 and 8 have been simplified in various respects with regard to the current examples. For example, in FIGS. 6 and 7 the determined edge location is illustrated as being between a relatively lighter region (e.g., near white) and a darker region, while in certain actual embodiments the "lighter region" may have a higher gray value (e.g., depending on the background in the image behind the reference surface portions), while the reference surface portions may be of different colors or shades (e.g., as illustrated by the example "gray values" 825 of FIG. 8). In addition, while the edges in FIGS. 6 and 7 are shown as being relatively "sharp" (i.e., with a relatively rapid transition between the lighter and darker regions), in certain actual embodiments the transition for the edges may occur over a number of pixels (e.g., as illustrated by the transition for the example gray values 825 from the pixel 23 to the pixel 27 in FIG. 8).

Gradient magnitude values 826 are derived from the pixel intensity values 825 and are also shown in FIG. 8. Various conventional algorithms may be used to find the location along the horizontal axis that corresponds to a peak of the gradient magnitude (deemed to indicate the peak "contrast" between the pixel intensity values), and identify that location as an edge location (e.g., as corresponding to a reference surface portion). If there are multiple gradient magnitude peaks, then the video tool edge selector and/or orientation indicator (e.g. edge selector 612 and/or polarity indicator 614 of the point tool 610) may be used to assist the algorithm to identify the desired peak. In FIG. 8, the maximum gradient criterion (i.e., the gradient peak) indicates that the edge is located approximately at data point 23. By using contrast curve analysis that may include curve fitting, centroid determination, or the like, a gradient magnitude peak may be located relatively precisely between the intensity profile data points, which generally supports sub-pixel measurement resolution and repeatability when determining the location of the corresponding edge in the image. For example, while the gradient peak in the example of FIG. 8 is shown to be approximately at data point 23 (e.g., corresponding to pixel 23 in this example), it can be seen that another "near peak" occurs at data point 24 (pixel 24). This may indicate that a more precise determination of the edge location may correspond to a position between data points 23 and 24 (pixels 23 and 24), which may be determined by contrast curve analysis including curve fitting, centroid determination, or the like. As a simplified concept, in an example where the data points 23 and 24 have a same gradient magnitude, such may correspond to an edge location exactly ½ way between the two (e.g., with an edge location corresponding to a data point/pixel location of 23.5).

Figure 9:
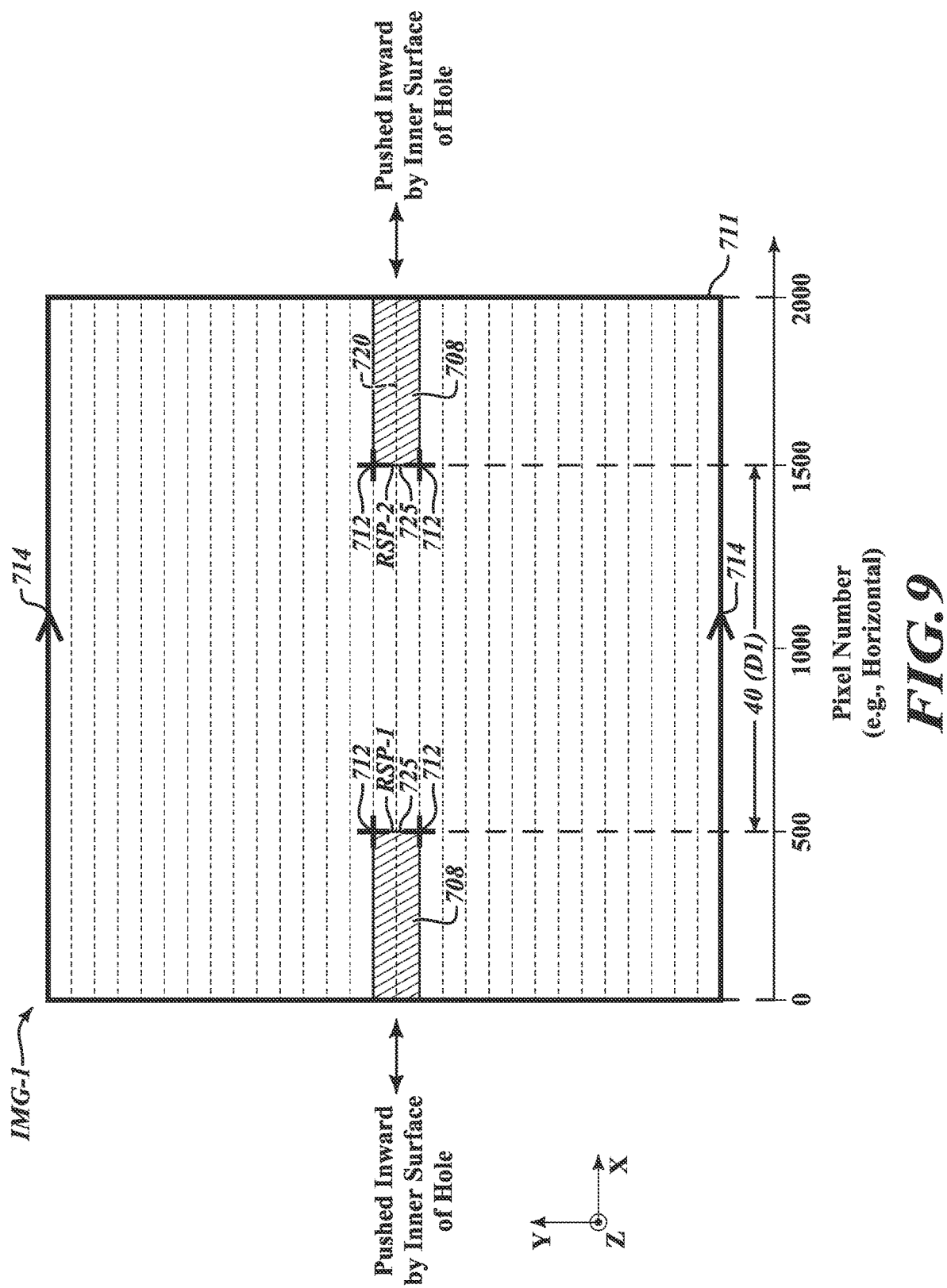
FIG. 9 is a diagram illustrating scan lines (e.g., of a box tool) overlaying first and second reference surface portions which are at first relative positions and are separated by a first reference distance.
Figure 10:
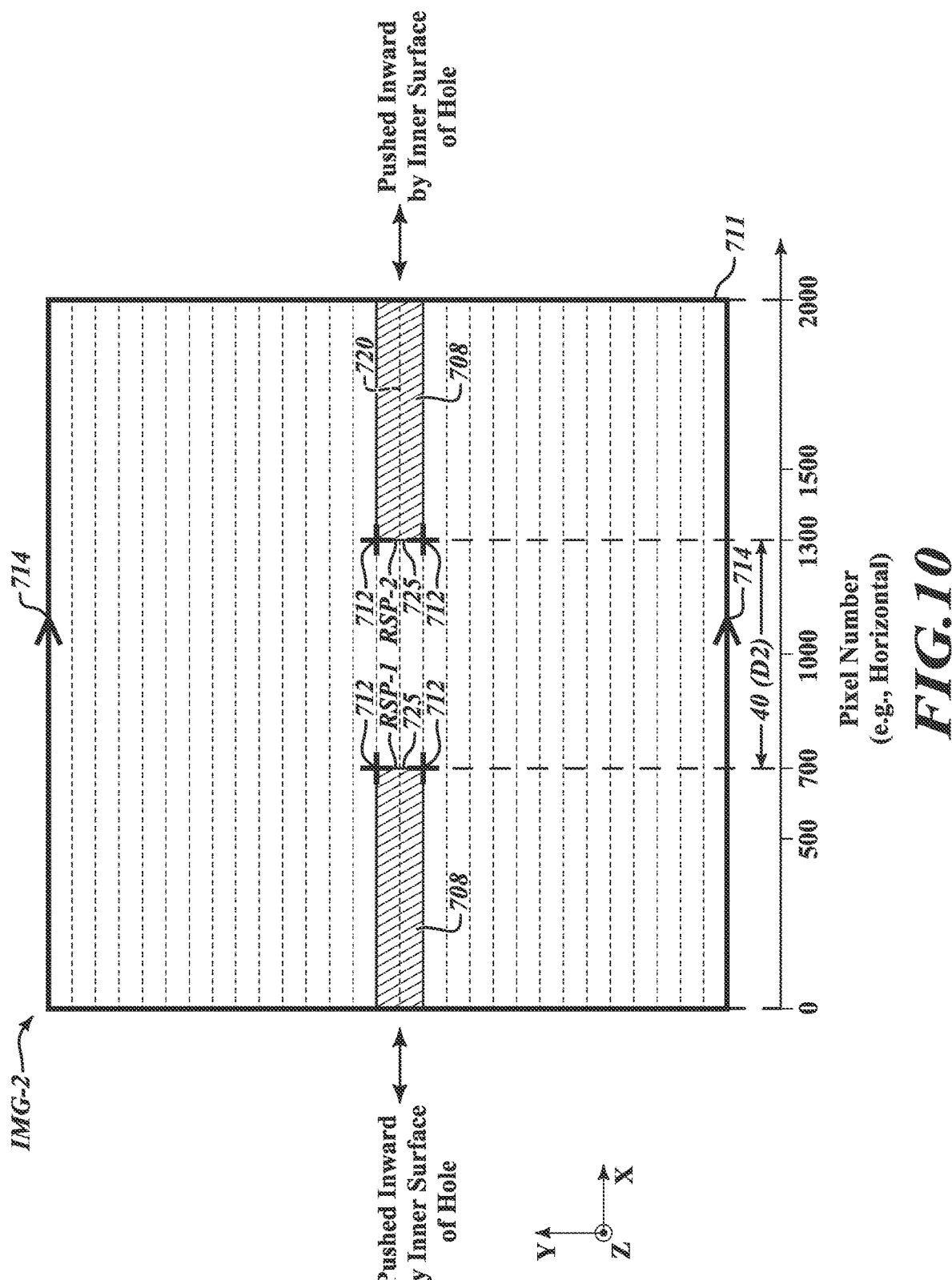
FIG. 10 is a diagram illustrating scan lines (e.g., of a box tool) overlaying the first and second reference surface portions of FIG. 9 which are at second relative positions and are separated by a second reference distance which is smaller than the first reference distance.

FIG. 9 is a diagram of a first image IMG-1 (e.g., as captured by the imaging portion 20 such as that of FIG. 1, 2A or 4A), illustrating scan lines 720 (e.g., of a box tool 710 such as that of FIG. 7) overlaying first and second reference surface portions RSP-1 (30) and RSP-2 (30') which are at first relative positions (e.g., corresponding to pixel locations of 500 and 1500) and are separated by a reference distance D1 (40). FIG. 10 is a diagram of a second image IMG-2 (e.g., as captured by the imaging portion 20 such as that of FIG. 1, 2A or 4A), illustrating scan lines 720 (e.g., of a box tool 710 such as that of FIG. 7) overlaying first and second reference surface portions RSP-1 (30) and RSP-2 (30') which are at second relative positions (e.g., corresponding to pixel locations of 700 and 1300) and are separated by a reference distance D2 (40), which is smaller than the reference distance D1 of FIG. 9.

For purposes of illustration of certain scan line principles, the box tools of FIGS. 9 and 10 (similar to a box tool 710 such as that illustrated in FIG. 7 above) are illustrated as being approximately the same size as and covering the entire images IMG-1 and IMG-2. It will be appreciated, however, that in various implementations certain smaller box tools with regions of interest ROI that cover only part of an image and/or similar scan line processes may be utilized. In the particular illustrated examples, the full images IMG-1 and IMG-2 and/or regions of interest of the box tools have dimensions of approximately 2000 pixels×2000 pixels, which may correspond to an imaged area of 2 mm×2 mm for example. In some implementations, the imaging portion 20 may be configured (e.g., with a correspondingly sized camera, image sensor, etc.) to capture a portion of the view of FIG. 3A, 3B or 5. In some instances the image may be square or rectangular in accordance with a correspondingly configured sensor array, but for which the captured images are large enough to include the corresponding first and second reference surface portions RSP-1 (30) and RSP-2 (30'). In other implementations, the imaged areas may be larger, for example, to include at least the entire circular area that is visible within the support element 13 in the views of FIGS. 3A, 3B and 5.

As illustrated in FIGS. 9 and 10, each of the box tools includes the region of interest (ROI) indicator 711. In the examples of FIGS. 9 and 10, the region of interest of the corresponding box tool may be used to define or detect two edges as corresponding to the first and second reference surface portions RSP-1 (30) and RSP-2 (30'). For each of the first and second reference surface portions RSP-1 (30) and RSP-2 (30'), edge selectors 712 may overlay edges 725 of a corresponding shaded area 708, as corresponding to the locations of the first and second reference surface portions RSP-1 (30) and RSP-2 (30') in the illustrated examples. In the illustrated implementations, the shaded areas 708 correspond to the areas of the first and second movable element 32, 32' (32A, 32A') in FIGS. 3A and 3B or of the first and second reference elements 42, 42' in FIG. 5.

In various implementations, these types of operations to determine the locations of the first and second reference surface portions RSP-1 (30) and RSP-2 (30') in the first and second images IMG-1 and IMG-2 may be performed with various sized box tools. For example, such operations may be performed with a single large box tool having the large region of interest (ROI) 711 such as shown in FIGS. 9 and 10, or with multiple uses of individual smaller tools as shown in FIGS. 6 and 7, or otherwise as performed using scan lines or similar operations (e.g., such as with or without other tool features as described above).

In FIG. 9, in the first image IMG-1, the first reference surface portion RSP-1 (30) is indicated/determined to be at a horizontal pixel location of 500, and the second reference surface portion RSP-2 (30') is indicated/determined to be at a horizontal pixel location of 1500, for which the corresponding reference distance D1 (40) corresponds to 1000 pixels. In FIG. 10, in the second image IMG-2, the first reference surface portion RSP-1 (30) is indicated/determined to be at a horizontal pixel location of 700, and the second reference surface portion RSP-2 (30') is indicated/determined to be at a horizontal pixel location of 1300, for which the corresponding reference distance D2 (40) corresponds to 600 pixels. In an implementation where 1000 pixels=1.0 mm (e.g., in accordance with a known magnification and separation distance of the imaging portion 20 from the reference surface portions RSP (30, 30') and other imaged elements, etc.), the separation distance D1 corresponds to 1.0 mm, and the separation distance D2 corresponds to 0.6 mm. The difference between the two (i.e., 1.0 mm-0.6 mm=0.4 mm) may indicate a difference between the diameter of two holes. For example, the first image IMG-1 may correspond to a measurement of a first hole 31-1 in FIG. 13 and the second image IMG-2 may correspond to a measurement of a second hole 31-2 in FIG. 14, wherein the diameter d2 (36) of the second hole 31-2 may be 0.4 mm smaller than the diameter d1 (36) of the first hole 31-1.

Figure 13:
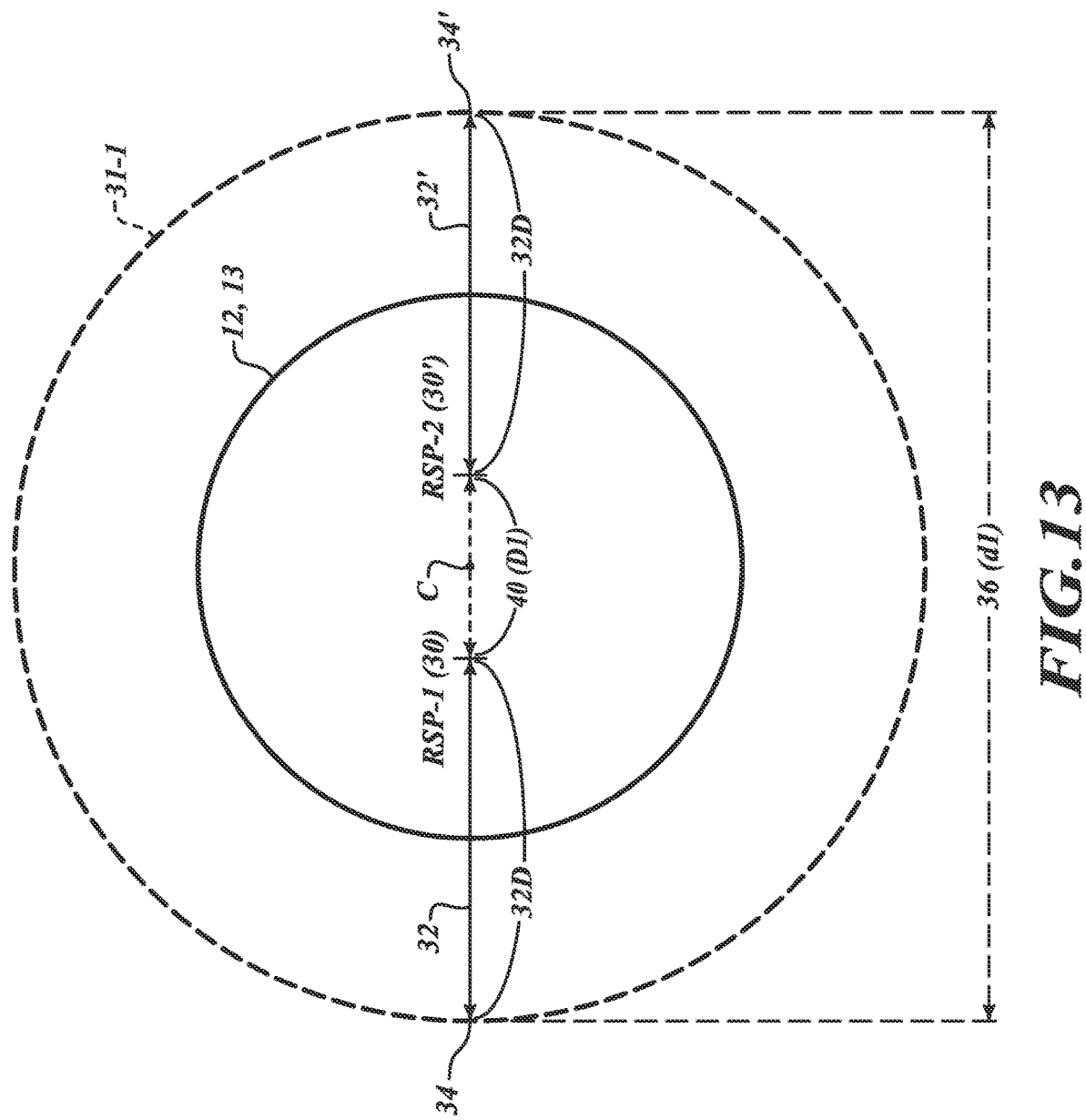
FIG. 13 is a diagram illustrating a cross-sectional top view of a first hole and a hole measuring device with first and second reference surface portions which are at first relative positions and are separated by a first reference distance, which may generally correspond to FIGS. 9 and 11.
Figure 14:
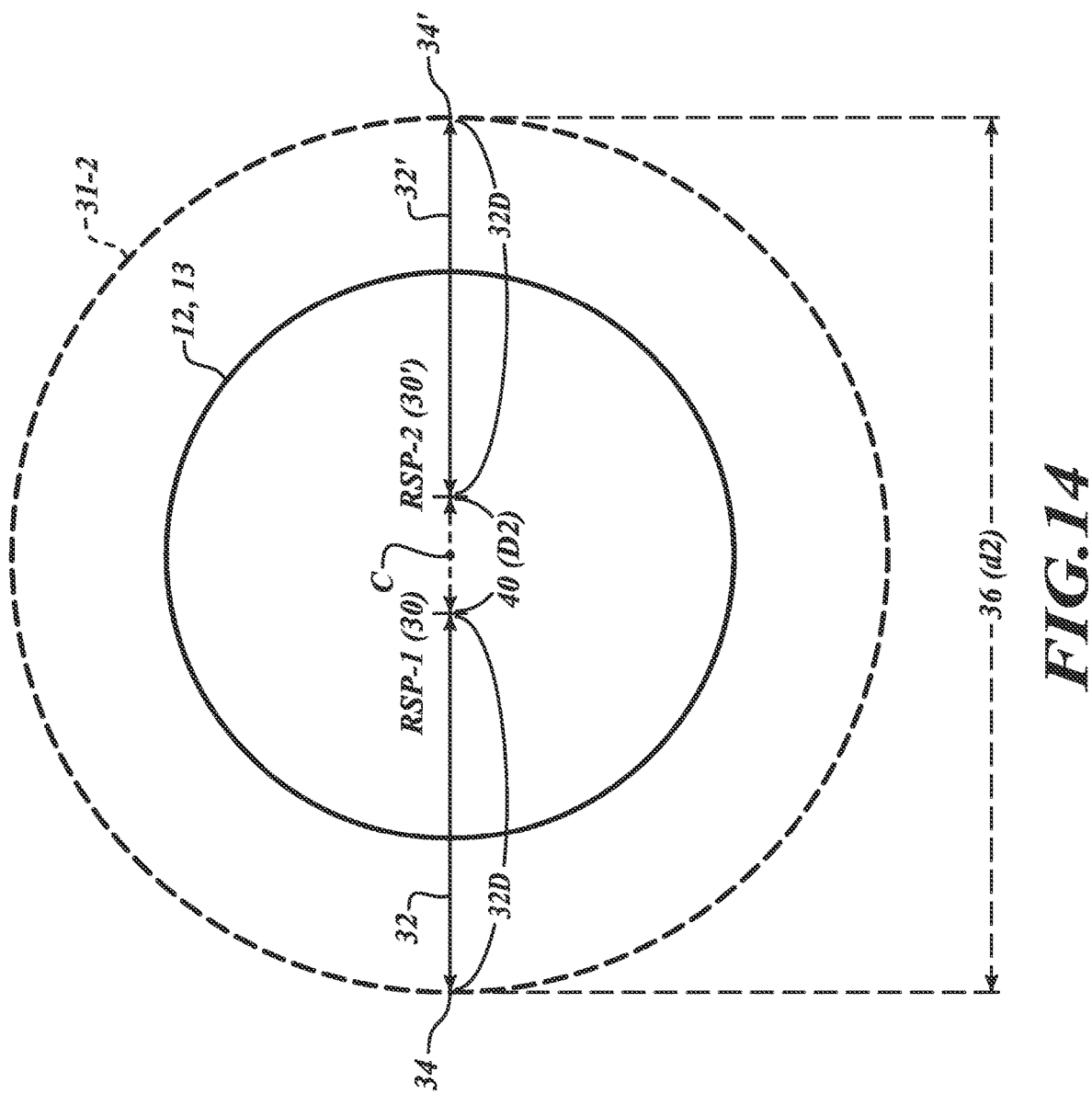
FIG. 14 is a diagram illustrating a cross-sectional top view of a second hole and the hole measuring device of FIG. 13 with the first and second reference surface portions at second relative positions separated by a second reference distance which is smaller than the first reference distance of FIG. 13, which may generally correspond to FIGS. 10 and 12.

As will be described in more detail below, FIG. 13 provides an example of how the reference distance D1 of 1.0 mm may correspond to a hole diameter d1 of 5.0 mm, and FIG. 14 provides an example of how the reference distance D2 of 0.6 mm may correspond to a hole diameter d2 of 4.6 mm. As will be described with respect to FIGS. 13 and 14, reference distances (e.g., reference distances D1 and D2 of FIGS. 9 and 10) may correspond to the first and second reference surface portions RSP-1 (30) and RSP-2 (30') being pushed inward to be at respective positions by the inner surfaces 31S of respective holes 31 having respective diameters. In various implementations, the determined reference distances (e.g., reference distances D1 and D2 of FIGS. 9 and 10) may be utilized to determine the diameters of holes 31 that are being measured (e.g., in accordance with at least one of an equation, calculation, calibration data, etc. for determining the diameter of the hole 31 as based on the measured/determined reference distance 40). In certain examples/implementations, the first and second reference surface portions RSP-1 (30) and RSP-2 (30') of FIGS. 9 and 10 may correspond to the first and second reference surface portions 30, 30' of FIGS. 2A-2B, 3A-3B and/or FIGS. 4A-4B and 5. In such examples, the images IMG-1 and IMG-2 may be captured by the corresponding imaging portion 20 (e.g., with the images as corresponding to a central portion of the view of FIG. 3A, 3B or 5).

Figure 11:
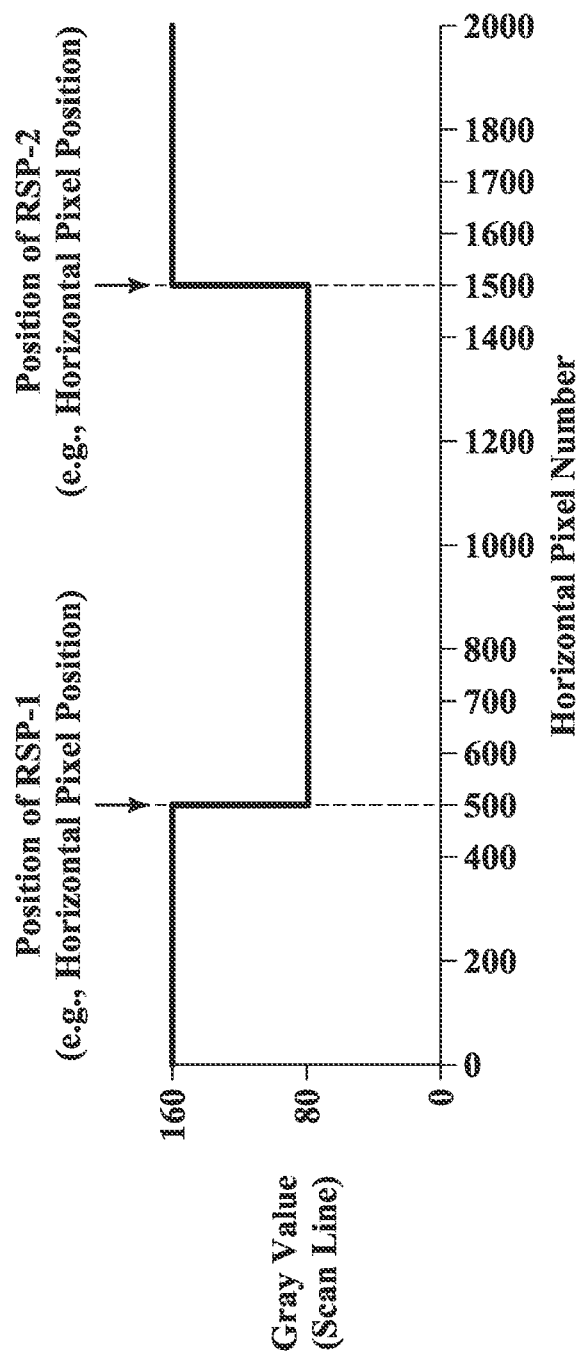
FIG. 11 is a diagram illustrating one exemplary method of determining, in relation to the aspects illustrated in FIG. 9, locations of the first and second reference surface portions.
Figure 12:
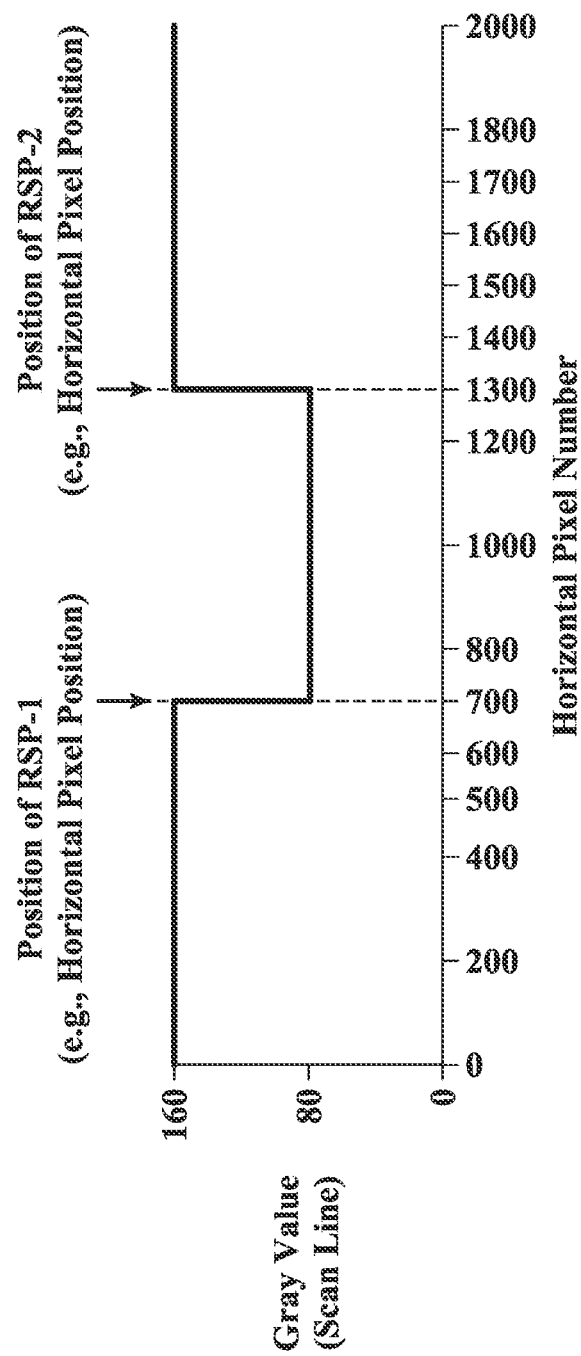
FIG. 12 is a diagram illustrating one exemplary method of determining, in relation to the aspects illustrated in FIG. 10, locations of the first and second reference surface portions.

FIG. 11 is a diagram illustrating one exemplary method of determining, in relation to the aspects illustrated in FIG. 9, locations of the first and second reference surface portions RSP-1 (30) and RSP-2 (30') based on sets of pixel gray values. FIG. 12 is a diagram illustrating one exemplary method of determining, in relation to the aspects illustrated in FIG. 10, locations of the first and second reference surface portions RSP-1 (30) and RSP-2 (30') based on sets of pixel gray values.

In FIGS. 11 and 12, the data points (pixel positions) are labeled as "Horizontal Pixel Number" from 0-2000 along the horizontal axis, which may correspond to the x-axis direction in the illustrated example. The indicated pixels correspond to the pixels of the region of interest (ROI) indicator 711 of FIGS. 9 and 10, including 2000 pixels along the x-axis. That is, the box tool in each instance has a width and height of 2000 pixels, with each horizontal scan line 720 extending over 2000 pixels. In FIGS. 11 and 12, the graph in each instance indicates an intensity profile, respectively, in each case comprising a set of image pixel intensity (gray) values. For example, the darker regions with the higher gray values in these examples may correspond to the movable elements 32, 32A in an implementation such as that of FIGS. 3A-3B, or to the reference elements 42 in an implementation such as that of FIG. 5. In either case the lighter regions with the lower gray values in these examples may correspond to the spacing between the first and second reference surface portions RSP-1 (30) and RSP-2 (30').

In the example of FIG. 11, the relatively darker regions are shown to occur from data points 0 to 500 and 1500 to 2000, and the relatively lighter region is shown to occur from data points 500 to 1500 (i.e., as corresponding to the spacing/reference distance between the first and second reference surface portions RSP-1 and RSP-2). In the example of FIG. 12, the relatively darker regions are shown to occur from data points 0 to 700 and 1300 to 2000, and the relatively lighter region is shown to occur from data points 700 to 1300 (i.e., as corresponding to the spacing/reference distance between the first and second reference surface portions RSP-1 and RSP-2). With respect to the examples of FIGS. 9 and 10, in some implementations it may be useful to take data from several scan lines 720 (e.g., including additional scan lines at different vertical/y-axis positions that extend over the first and second reference surface portions RSP-1 and RSP-2) in order to determine precise locations (e.g., horizontal pixel locations) of the first and second reference surface portions RSP-1 and RSP-2.

In various implementations, after the relative positions of the first and second reference surface portions RSP-1 (30) and RSP-2 (30') are determined, a reference distance 40 between the first and second reference surface portions RSP-1 (30) and RSP-2 (30') may be determined. As a specific numerical example, the reference distance in FIG. 11 may be determined according to the difference in relative positions of the first and second reference surface portions RSP-1 and RSP-2, for which the reference distance=1500 pixels–500 pixels=1000 pixels. Similarly, the reference distance in FIG. 12 may be determined according to the difference in relative positions of the first and second reference surface portions RSP-1 and RSP-2, for which the reference distance=1300 pixels–700 pixels=600 pixels. In a specific numerical example where 1000 pixels=1.0 mm, these reference distances of FIGS. 11 and 12 may correspond to 1.0 mm and 0.6 mm, respectively. As will be described in more detail below with respect to FIGS. 13 and 14, such determined/measured reference distances 40 may be utilized to determine the diameter of a corresponding hole that is being measured. It will be appreciated that while various implementations that utilize scan lines and similar techniques for determining the locations of reference surface portions RSP (30, 30') and corresponding reference distances (40) have been described with respect to the above examples, in certain alternative implementations other known techniques of image processing may also/alternatively be utilized for determining the locations of the reference surface portions RSP (30, 30') in the images and/or for determining the respective reference distances (40).

FIG. 13 is a diagram illustrating a cross-sectional top view of a first hole 31-1 and a hole measuring device 12 with first and second reference surface portions RSP-1 (30) and RSP-2 (30') which are at first relative positions and are separated by a first reference distance 40 (D1), which generally corresponds to FIGS. 9 and 11. In one specific numerical example, the reference distance D1 equals 1.0 mm. FIG. 13 illustrates the full relationship of the reference distance D1 to the first hole 31-1 and the support element 13, and how the reference distance D1 (40) of 1.0 mm corresponds to/indicates diameter d1 (36) of the first hole of 5.0 mm.

FIG. 14 is a diagram illustrating a cross-sectional top view of a second hole 31-2 and the hole measuring device 12 of FIG. 13 with the first and second reference surface portions RSP-1 (30) and RSP-2 (30') at second relative positions and separated by a second reference distance 40 (D2), which generally corresponds to FIGS. 10 and 12. In one specific numerical example, the reference distance D2 equals 0.6 mm. FIG. 14 illustrates the full relationship of the reference distance D2 to the second hole 31-2 and the support element 13, and how the reference distance D2 (40) of 0.6 mm corresponds to/indicates diameter d2 (36) of the second hole of 4.6 mm.

Referring to FIG. 13, in one specific numerical example, if the first and second movable elements 32, 32' or 32A, 32A' as shown in FIGS. 3A and 3B are included in the hole measuring device 12, each having a length 32D (i.e., generally perpendicular to the axis of the hole 31) that is approximately 2 mm, and the reference distance D1 is 1 mm, then the measured hole diameter d1 (36) may be determined as 5 mm (e.g., according to the formula where the hole diameter is equal to the length 32D of the first movable element 32 or 32A plus the reference distance D1 plus the length 32D of the second movable element 32' or 32A'). The support element 13 (e.g., the metal tube) in this specific numerical example has a diameter of 3 mm. As described above in relation to FIGS. 2A-2B and 3A-3B, the support element 13 may include openings 35, 35' provided on the sides, through which the movable elements 32, 32', 32A, 32A' radially move outwardly or inwardly.

FIG. 14 illustrates the second hole 31-2 having a smaller diameter d2, as compared to FIG. 13. In one specific numerical example, the first and second movable elements 32, 32' or 32A, 32A' each have a length 32D of 2 mm, and the reference distance D2 (40) is 0.6 mm, for which the measured hole diameter is 4.6 mm (e.g., in accordance with an equation for which the hole diameter equals the length 32D of the first movable element 32 or 32A plus the reference distance D2 plus the length 32D of the second movable element 32' or 32A'). The support element 13 (e.g., the metal tube) has a diameter of 3.0 mm in the illustrated implementation.

In various implementations, the movable elements 32, 32', 32A, 32A' may be disks or spheres (e.g., sliding through slits, slots or appropriately shaped holes 35, 35' in the sides of the support element 13), or thin rods as constrained and sliding through correspondingly sized holes in the sides of the support element 13. For example, flexible portions 38 such as bendable elements, springs, etc., may be utilized to spring-load or otherwise bias the movable elements 32 (e.g., which in certain implementations may be spheres, or disks, or rods, etc.) to extend outward for pressing against the Inner surface 31S of a hole 31 into which the end portion 14 of the hole measuring device 12 is inserted. In certain implementations, a mechanism may be utilized, or the hole measuring device 12 may otherwise be configured, such that the movable elements 32 may be retracted or otherwise remain in inward positions in the support element 13, until the end portion 14 of the hole measuring device 12 is inserted into the hole 31, after which the mechanism or other technique may be utilized to cause the movable elements 32 to be biased outward toward the inner surface 31S of the hole 31. For example, in one implementation a mechanism (e.g., a rod, etc.) may extend up to the top of the hole measuring device 12, wherein when the rod is moved (e.g., by a user, such as pushed downward or pulled upward), it may release or otherwise cause the movable elements 32 to extend outward to contact the inner surface 31S of a hole 31 in which the end portion 14 has been inserted. In such an implementation, the rod may be located off to the side (relative to an axial center of the end portion 14) or have split portions extending down the sides or otherwise located/configured so as to not inhibit the view of the imaging portion 20 for imaging the reference surface portions 30, 30' for determining the reference distance 40.

In the example of FIGS. 13 and 14, the movable elements 32, 32' are represented as relatively thin arrows or rods. For example, in certain implementations, the movable elements 32, 32' may be thin rods. Alternatively, the representation of FIGS. 13 and 14 may be indicating a central axis or other representative middle portion of a relatively wider movable element, such as a wider rod, disk or sphere, etc. (e.g., such as that of FIG. 3A or 3B). As illustrated in FIGS. 13 and 14, for each of the first and second movable elements 32, 32', one end is designated as the outer contact surface portion 34, 34', and the other end is designated as a reference surface portion 30, 30' (RSP-1, RSP-2).

In certain alternative implementations (e.g., as illustrated in FIGS. 4A-4B), the support element 13 may have sides 46, 46' that can bend inward (e.g., with a slit 44 in the end part of the support element 13 to enable the inward bending), and for which the movable elements 32, 32' may be attached to the outer sides of the support element 13, such that the movable elements 32, 32' can be pushed inward as the end portion 14 is inserted into a hole 31. For example, the top edges of the hole 31 push the movable elements 32, 32' inward as the movable elements 32, 32' first move/slide past the top edges into the hole 31. In such implementations, the reference surface portions 30, 30' may be on separate reference elements 42, 42', as opposed to being on the movable elements 32, 32', and the reference elements 42, 42' may be attached to the inner sides of the support element 13.

It is noted that the reference distances D1 and D2 of 1.0 mm and 0.6 mm of FIGS. 13 and 14, respectively, are consistent with certain other examples shown in other figures herein (i.e., FIGS. 9-12), such as wherein 1.0 mm equals 1000 pixels and 0.6 mm equals 600 pixels in the images captured by the imaging portion 20.

In various implementations, the first reference surface portion 30 (RSP-1) may be designated as being in a first relative position in FIG. 13, and as being in a second relative position in FIG. 14. In other words, the relative position of the first reference surface portion 30 (RSP-1) varies depending on the diameter d1 or d2 of the hole 31-1 or 31-2. In various implementations, the relative position of the first reference surface portion 30 (RSP-1) may be in relation to the second reference surface portion 30' (RSP-2) (e.g., in accordance with the reference distance 40), or in relation to a center "C" of the hole (e.g., as determined as a midpoint of the reference distance 40 in implementations where the first and second movable elements 32, 32' have an identical length 32D), or in relation to an upper portion or other part of the hole measuring device 12, etc. In some configurations, the center of the hole 31 can be determined and/or corresponds to the midpoint of the reference distance 40 (e.g., in implementations where the first and second movable elements 32, 32' each have a same length 32D, etc.).

In all of the examples described herein in relation to FIGS. 2A-14, a contact distance 36 between the first and second outer contact surface portions 34, 34' is generally equal to the diameter of the hole 31. In various implementations, the described system 10 is generally configured to determine/measure the reference distance 40 for determining the diameter of the hole 31 (e.g., as corresponding to the contact distance 36). As will be described in more detail below with respect to FIG. 15, in an alternative version with three outer contact surface portions 34, 34', 34", a contact distance 36, 36', 36" between two of the outer contact surface portions 34, 34', 34" is not equal to the diameter of the hole, but may be related to the diameter of the hole by known geometric/trigonometric properties/principles, as will be illustrated/described in more detail below.

It will be appreciated that a hole measuring device 12 such as that illustrated in FIGS. 13 and 14 may be configured to measure holes 31 with diameters that vary over a relatively large range (e.g., as compared to certain prior art bore gauges etc. which are each configured to only measure a relatively small range of hole sizes such as with a relatively small percentage variation). As a specific numerical example, the hole measuring device 12 of FIGS. 13 and 14 may be able to measure holes 31 with a diameter as small as 4 mm (e.g., with the first and second movable elements 32, 32' pushed all the way into the support element 13) and as large as 7 mm (e.g., with the first and second movable elements 32, 32' extended all the way out from the support element 13). The hole measuring device 12 thus has a measuring range of 4 mm to 7 mm (i.e., with the range covering 3 mm of difference, which is equal to the 3 mm diameter of the support element 13). As another example, a hole measuring device 12 with a 5 mm diameter support element 13 and first and second movable elements 32, 32' that are each 2.5 mm long, would be able to measure holes 31 with a diameter as small as 5 mm (e.g., with the first and second movable elements 32, 32' pushed all the way into the support element 13) and as large as 10 mm (e.g., with the first and second movable elements 32, 32' extended all the way out of the support element 13). The hole measuring device 12 would thus have a measuring range of 5 mm to 10 mm (i.e., with the range covering 5 mm of difference, which is equal to the 5 mm diameter of the support element 13). In various implementations, certain configurations may generally have a range which extends over/covers an amount of difference (i.e., of different sized hole diameters that can be measured) that may be as much as approximately equal to the diameter of the support element 13, or in some implementations with more limited extension and retraction of the movable elements, that is equal to at least 50%, or at least 25% of the diameter of the support element 13. In some implementations this may be characterized as a percentage difference between the smallest and largest diameter holes 31 that can be measured, such as being able to measure a larger hole that varies by at least 25%, or at least 50% relative to a smaller hole (e.g., for a range between 4 mm and 6 mm, the 6 mm diameter would correspond to a 50% difference relative to the 4 mm diameter).

Figure 15:
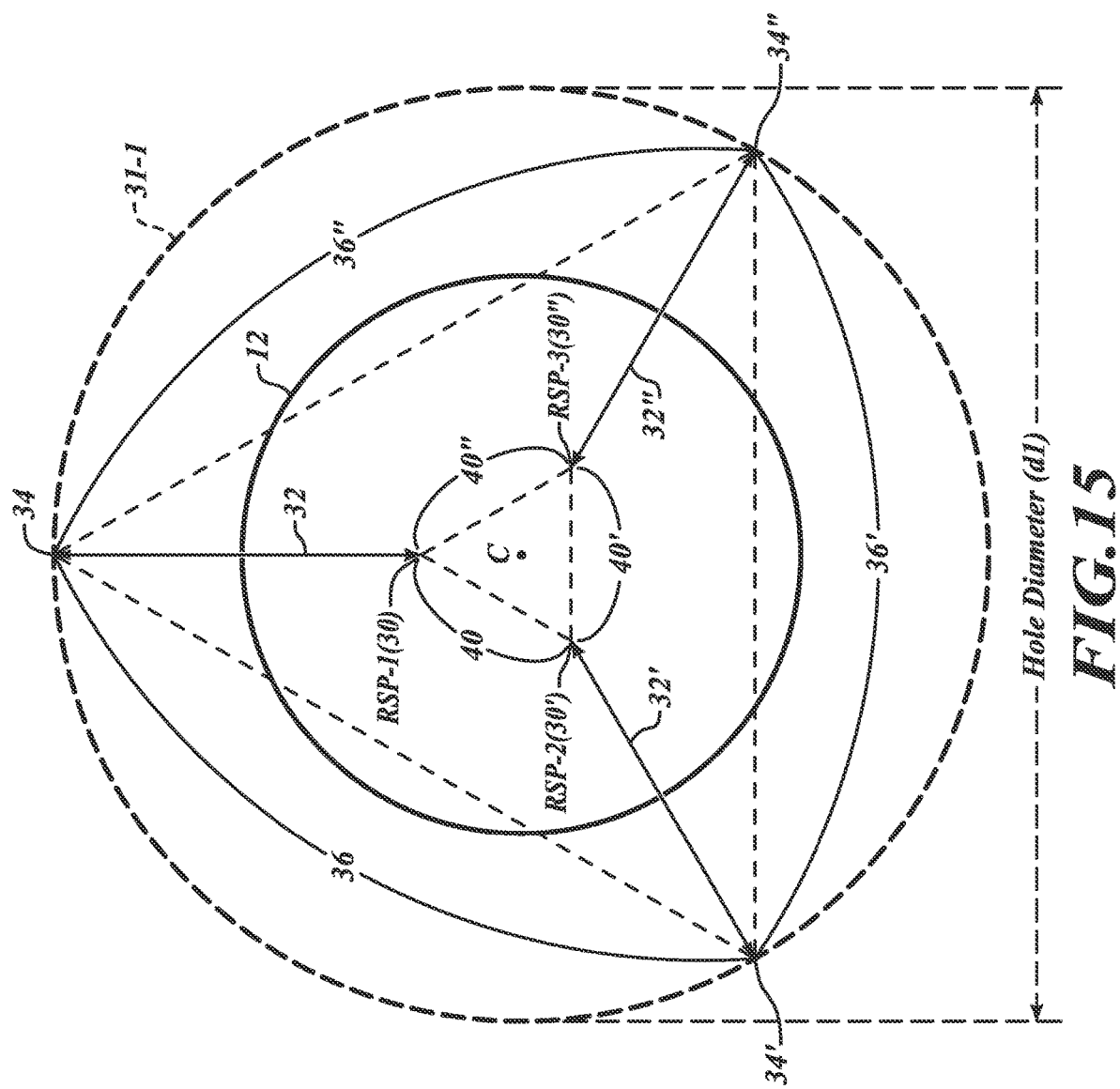
FIG. 15 is a diagram illustrating a cross-sectional top view of the first hole and an implementation of a hole measuring device with first, second and third reference surface portions.

FIG. 15 is a diagram illustrating a cross-sectional top view of the first hole 31-1 and an implementation of a hole measuring device 12 with first, second and third reference surface portions RSP-1 (30), RSP-2 (30') and RSP-3 (30"). Specifically, the hole measuring device 12 of FIG. 15 utilizes three movable elements 32, 32', 32" with corresponding three outer contact surface portions 34, 34', 34" and three reference surface portions 30, 30', 30" (e.g., all spaced at 120 degree intervals, such as in rotation around a central axis C of the hole measuring device 12 and/or the first hole 31-1 to be measured). The three movable elements 32, 32', 32" may be configured to be movable in directions substantially orthogonal to the axial direction of the hole measuring device 12 and the axial direction (i.e., corresponding to the axis) of the first hole 31-1.

A similar configuration may also be made according to the principles illustrated with respect to FIGS. 4A and 4B, for which three slits 44 may be cut into or otherwise provided in the end portion 14 of the hole measuring device 12, for enabling three attached movable elements 32, 32', 32" as attached to the outer surfaces of the three sides (fingers) 46, 46', 46" of the support element 13 (as separated by the three slits 44) to be squeezed inward when the end portion 14 is inserted into a hole 31 and for which corresponding three reference elements 42, 42', 42" with three reference surface portions 30, 30', 30" could be attached to the inner sides of the three sides (fingers) 46, 46', 46" of the lower portion of the support element 13.

In the illustrated example of FIG. 15, if the movable elements 32, 32', 32" extend all the way through (e.g., similar to the implementation of FIGS. 3A and 3B), and if equilateral triangles are formed by the reference distances 40, 40', 40" and contact distances 36, 36', 36" (e.g., in accordance with each of the movable elements 32, 32', 32" as having a same length and spaced at 120 degree intervals), then the diameter of the first hole 31-1 may be found according to the following equation:

$$\text{Diameter}=2(\text{length of movable element}+(\text{reference distance})(\sqrt{3}/3)) \quad \text{(Eq. 1)}$$

For example, if the length of a movable element 32, 32', 32" equals 2.0 mm, and the reference distance 40, 40', 40" equals 0.866 mm, then the diameter of the first hole 31-1 equals 2(2.0 mm+(0.866 mm)($\sqrt{3}/3$))=2(2.0 mm+0.5 mm)=5.0 mm. Similar to the previous examples, the reference distances 40, 40', 40" which are measured/determined by the system are related to and are indicative of the contact distances 36, 36', 36", and from which the diameter of the hole can be determined.

Some general principles which support (Eq. 1) above are described. For an equilateral triangle, for a center (i.e., which is equidistant from the three vertices), the distance from a vertex to the center may generally be equal to: (length of side of the triangle) ($\sqrt{3}/3$), in accordance with known trigonometric formulas. In the example of FIG. 15, the length of a side (of the inner equilateral triangle)=the reference distance (40, 40', 40"), and the "radius" of the hole=(length of the movable element (32, 32', 32"))+(distance from vertex of the inner equilateral triangle to the center). Stated another way, a movable element 32 extends from the inner surface of the first hole 31-1 to a corresponding vertex of the equilateral triangle of the reference distances 40, 40', 40", and the remaining distance to the center of the hole (i.e., from the reference surface portion 30 at the end of the movable element 32) is equal to (reference distance 40)($\sqrt{3}/3$)=(reference distance)(0.577). This remaining distance is added to the length of the movable element 32 to determine the radius of the first hole 31-1, and the radius is doubled (i.e., 2×) to determine the diameter of the first hole 31-1.

The first hole 31-1 in this specific numerical example of FIG. 15 is intended to be the same size as the first hole 31-1 in the specific numerical example of FIG. 13, with the movable elements 32, 32', 32" having the same lengths of 2.0 mm as the movable elements 32, 32' of FIG. 13, and for which the support element 13 (e.g., the metal tube) is of the same diameter of 3.0 mm. In some instances, in order to increase the repeatability/robustness/accuracy, it may be desirable to measure all three reference distances 40, 40', 40" in an implementation such as that of FIG. 15. For example, the average may be taken as the reference distance to utilize for the above calculations, or other calculations may be utilized/performed based on the three measured reference distances 40, 40', 40" in order to determine the diameter of the first hole 31-1, according to known trigonometric principles. In addition or alternatively, calibration data may be stored which relates measured/determined reference distances 40 (e.g., for one or more of the reference distances 40, 40', 40") to hole diameters (e.g., in accordance with known calibration processes and as described herein).

FIG. 16 is a flow diagram illustrating one embodiment of a general routine 1600 for utilizing a hole measuring device 12. The routine 1600 starts with block 1610 including utilizing an imaging portion 20 to acquire an image of one or more reference surface portions 30, 30' when an end portion 14 of a hole measuring device 12 is inserted in a hole 31 which is to be measured. As described herein, in various implementations the end portion 14 may comprise a plurality of outer contact surface portions 34, 34', 34" and one or more reference surface portions 30, 30', 30". In various implementations, the plurality of outer contact surface portions 34, 34', 34" are configured to contact the inner surface 31S of the hole 31 when the end portion 14 is inserted in the hole 31, and comprise at least first and second outer contact surface portions 34, 34' which are configured to be biased against the inner surface 31S of the hole 31 when the end portion 14 is inserted in the hole 31. A contact distance 36 between the first and second outer contact surface portions 34, 34' varies depending on the diameter of the hole 31. The one or more reference surface portions 30, 30', 30" comprise at least a first reference surface portion 30 which is configured to move when the first outer contact surface portion 34 moves, such that a relative position of the first reference surface portion 30 varies depending on the diameter of the hole 31.

At a block 1620, the acquired image of the one or more reference surface portions 30, 30', 30" is utilized to determine a relative position of at least the first reference surface portion 30. At a block 1630, a dimension is determined which at least one of indicates or is equal to the diameter of the hole 31 based at least in part on the relative position of the first reference surface portion 30 (e.g., wherein the determining of the dimension is based at least in part on determining a reference distance 40 between the first reference surface portion 30 and a second reference surface portion 30', such that the reference distance 40 indicates a relative position of the first reference surface portion 30 in relation to the second reference surface portion 30').

It will be appreciated that the principles disclosed and claimed herein may be readily and desirably combined with various features disclosed in the incorporated references. The various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for measuring a hole, the system comprising:
  a hole measuring device, comprising:
    an end portion which is configured to be inserted in a hole which is to be measured, the end portion comprising:
      a plurality of outer contact surface portions which are configured to be inserted in the hole and to contact the inner surface of the hole when the end portion is inserted in the hole, the plurality of outer contact surface portions comprising at least first and second outer contact surface portions which are configured to be biased against the inner surface of the hole when the end portion is inserted in the hole, such that a contact distance between the first and second outer contact surface portions varies depending on a diameter of the hole; and
      one or more reference surface portions which are configured to be imaged by an imaging portion, wherein the one or more reference surface portions comprise at least a first reference surface portion which is configured to move when the first outer contact surface portion moves, such that a relative position of the first reference surface portion varies depending on the diameter of the hole;
    a first movable element on which the first outer contact surface portion is located;
    a first flexible portion to which the first movable element is coupled, wherein:
      the first flexible portion is configured to enable the first movable element to be pushed inward and has a spring force which is configured to bias the first movable element outward toward the inner surface of the hole when the end portion is inserted in the hole; and
      the first flexible portion comprises at least one of:
        a first side of a support element that is included in the hole measuring device, wherein the first side of the support element is configured to radially-inward flex when the end portion is inserted in the hole; or
        a first bendable element which is attached to a side of a support element that is included in the hole measuring device, and for which the first movable element is correspondingly attached to the side of the support element via the first bendable element; and
    an imaging portion which comprises at least one of an image sensor or a camera;
  one or more processors; and
  a memory coupled to the one or more processors and storing program instructions that when executed by the one or more processors cause the one or more processors to at least:
    utilize the imaging portion to acquire an image of the one or more reference surface portions when the end portion is inserted in the hole which is to be measured;
    utilize the image to determine a relative position of at least the first reference surface portion; and
    determine a dimension which at least one of indicates or is equal to the diameter of the hole based at least in part on the relative position of the first reference surface portion.

2. The system of claim 1, wherein:
the one or more reference surface portions further comprise a second reference surface portion;
the utilizing of the image to determine the relative position of at least the first reference surface portion comprises utilizing the image to determine a reference distance between the first and second reference surface portions; and
the determining of the dimension which at least one of indicates or is equal to the diameter of the hole based at least in part on the relative position of the first reference surface portion comprises determining the dimension based at least in part on the reference distance between the first and second reference surface portions.

3. The system of claim 2, wherein the second reference surface portion is configured to move when the second outer contact surface portion moves.

4. The system of claim 2, wherein the relative position of the first reference surface portion is relative to the second reference surface portion and corresponds to the reference distance between the first and second reference surface portions.

5. The system of claim 2, wherein:
the contact distance between the first and second outer contact surface portions is at least one of indicative of or equal to the diameter of the hole; and
the reference distance between the first and second reference surface portions is related to the contact distance between the first and second outer contact surface portions, such that a change in the contact distance results in a change in the reference distance.

6. The system of claim 1, wherein the hole measuring device further comprises a second movable element and a second flexible portion, wherein the second outer contact surface portion is located on the second movable elements, which is coupled to the second flexible portion which enables the second movable elements to be pushed inward, wherein the second flexible portions has a spring force which biases the second movable elements outward toward the inner surface of the hole when the end portion is inserted in the hole.

7. The system of claim 6, wherein the one or more reference surface portions further comprise a second reference surface portion and the first and second reference surface portions are inner surfaces that are located either on inner sides of the first and second movable elements, respectively, or on inner sides of first and second reference elements, respectively.

8. The system of claim 1, wherein the utilizing of the image to determine at least a relative position of the first reference surface portion comprises utilizing a contrast curve analysis to determine a location of the first reference surface portion in the image.

9. The system of claim 1, wherein the utilizing of the image to determine at least a relative position of the first reference surface portion comprises utilizing an edge tool to determine a location of the first reference surface portion in the image.

10. The system of claim 1, wherein the contact distance is a first contact distance and the plurality of outer contact surface portions further comprise a third outer contact surface portion which is configured to be biased against the inner surface of the hole when the end portion is inserted in the hole, such that a second contact distance between the second and third outer contact surface portions and a third contact distance between the third and first outer contact surface portions vary depending on the diameter of the hole.

11. The system of claim 10, wherein:
the one or more reference surface portions further comprise second and third reference surface portions; and
the second and third reference surface portions are configured to move when the second and third outer contact surface portions move, respectively.

12. The system of claim 11, wherein:
the utilizing of the image to determine a relative position of at least the first reference surface portion comprises utilizing the image to determine a first reference distance between the first and second reference surface portions and a second reference distance between the second and third reference surface portions and a third reference distance between the third and first reference surface portions; and
the determining of the dimension of the hole which at least one of indicates or is equal to the diameter of the hole based at least in part on the relative position of the first reference surface portion comprises determining the dimension of the hole based at least in part on the determined first, second and third reference distances.

13. A method for utilizing a hole measuring device,
the hole measuring device comprising:
an end portion which is configured to be inserted in a hole which is to be measured, the end portion comprising:
a plurality of outer contact surface portions which are configured to be inserted in the hole and to contact the inner surface of the hole when the end portion is inserted in the hole, the plurality of outer contact surface portions comprising at least first and second outer contact surface portions which are configured to be biased against the inner surface of the hole when the end portion is inserted in the hole, such that a contact distance between the first and second outer contact surface portions varies depending on a diameter of the hole; and
one or more reference surface portions which are configured to be imaged by an imaging portion, wherein the one or more reference surface portions comprise at least a first reference surface portion which is configured to move when the first outer contact surface portion moves, such that a relative position of the first reference surface portion varies depending on the diameter of the hole; and
a first movable element on which the first outer contact surface portion is located;
a first flexible portion to which the first movable element is coupled, wherein:
the first flexible portion is configured to enable the first movable element to be pushed inward and has a spring force which is configured to bias the first movable element outward toward the inner surface of the hole when the end portion is inserted in the hole; and
the first flexible portion comprises at least one of:
a first side of a support element that is included in the hole measuring device, wherein the first side of the support element is configured to radially-inward flex when the end portion is inserted in the hole; or
a first bendable element which is attached to a side of a support element that is included in the hole measuring device, and for which the first movable element is correspondingly attached to the side of the support element via the first bendable element; and
an imaging portion which comprises at least one of an image sensor or a camera;
the method comprising:
utilizing the imaging portion to acquire an image of the one or more reference surface portions when the end portion is inserted in the hole which is to be measured;
utilizing the image to determine a relative position of at least the first reference surface portion; and determining a dimension which at least one of indicates or is equal to the diameter of the hole based at least in part on the relative position of the first reference surface portion.

14. The method of claim 13, wherein:
the one or more reference surface portions further comprise a second reference surface portion;
the utilizing of the image to determine the relative position of at least the first reference surface portion comprises utilizing the image to determine a reference distance between the first and second reference surface portions; and
the determining of the dimension which at least one of indicates or is equal to the diameter of the hole based at least in part on the relative position of the first reference surface portion comprises determining the dimension based at least in part on the reference distance between the first and second reference surface portions.

15. A hole measuring device, comprising:
an end portion which is configured to be inserted in a hole which is to be measured, the end portion comprising:
  a plurality of outer contact surface portions which are configured to be inserted in the hole and to contact the inner surface of the hole when the end portion is inserted in the hole, the plurality of outer contact surface portions comprising at least first and second outer contact surface portions which are configured to be biased against the inner surface of the hole when the end portion is inserted in the hole, such that a contact distance between the first and second outer contact surface portions varies depending on a diameter of the hole; and
  one or more reference surface portions which are configured to be imaged by an imaging portion, wherein the one or more reference surface portions comprise at least a first reference surface portion which is configured to move when the first outer contact surface portion moves, such that a relative position of the first reference surface portion varies depending on the diameter of the hole; and
a first movable element on which the first outer contact surface portion is located;
a first flexible portion to which the first movable element is coupled, wherein:
  the first flexible portion is configured to enable the first movable element to be pushed inward and has a spring force which is configured to bias the first movable element outward toward the inner surface of the hole when the end portion is inserted in the hole; and
  the first flexible portion comprises at least one of:
    a first side of a support element that is included in the hole measuring device, wherein the first side of the support element is configured to radially-inward flex when the end portion is inserted in the hole; or
    a first bendable element which is attached to a side of a support element that is included in the hole measuring device, and for which the first movable element is correspondingly attached to the side of the support element via the first bendable element; and
an imaging portion which comprises at least one of an image sensor or a camera;
wherein the imaging portion is configured to be utilized to acquire an image of the one or more reference surface portions when the end portion is inserted in the hole which is to be measured, and the acquired image is configured to be utilized to determine a relative position of at least the first reference surface portion, and a dimension which at least one of indicates or is equal to the diameter of the hole is determined based at least in part on the relative position of the first reference surface portion.

16. The hole measuring device of claim 15, wherein:
the one or more reference surface portions further comprise a second reference surface portion;
the utilizing of the image to determine the relative position of at least the first reference surface portion comprises utilizing the image to determine a reference distance between the first and second reference surface portions; and
the determining of the dimension of the hole which at least one of indicates or is equal to the diameter of the hole based at least in part on the relative position of the first reference surface portion comprises determining the dimension of the hole based at least in part on the reference distance between the first and second reference surface portions.

17. The hole measuring device of claim 15, further comprising a second movable element and a second flexible portion, wherein the second outer contact surface portion is located on the second movable elements, which is coupled to the second flexible portion which enables the second movable elements to be pushed inward, wherein the second flexible portions has a spring force which biases the second movable elements outward toward the inner surface of the hole when the end portion is inserted in the hole.

18. The system of claim 1, wherein the support element comprises a tube.

19. The system of claim 1, wherein the first flexible portion comprises the first side of the support element.

20. The system of claim 19, wherein the support element has slits that extend along an axis of the support element for enabling the radial-inward flexing of the first side of the support element.

21. The system of claim 1, wherein:
the first reference surface portion which is configured to move when the first outer contact surface portion moves is included on a first reference element; and
the first reference element is attached inside the support element and is separate from the first movable element on which the first outer contact surface portion is located.

* * * * *